US012737737B2

(12) United States Patent
Koren et al.

(10) Patent No.: US 12,737,737 B2
(45) Date of Patent: Sep. 15, 2026

(54) SYSTEMS AND METHOD FOR AUTOMATIC TRANSACTION ROUTING AND EXECUTION

(71) Applicant: Forter Ltd, New York, NY (US)

(72) Inventors: Erez Koren, Mizra (IL); Guy Zucker, Tel Aviv (IL); Galit Shani-Michel, Nofit (IL)

(73) Assignee: Forter Ltd, New York, NY (US)

( * ) Notice: Subject to any disclaimer, the term of this patent is extended or adjusted under 35 U.S.C. 154(b) by 300 days.

(21) Appl. No.: 17/718,058

(22) Filed: Apr. 11, 2022

(65) Prior Publication Data

US 2022/0327504 A1 Oct. 13, 2022

Related U.S. Application Data

(60) Provisional application No. 63/173,779, filed on Apr. 12, 2021.

(51) Int. Cl.

| | |
|---|---|
| ***G06Q 20/08*** | (2012.01) |
| ***G06F 11/362*** | (2025.01) |
| ***G06N 20/20*** | (2019.01) |

(52) U.S. Cl.

CPC ......... *G06Q 20/08* (2013.01); *G06F 11/3636* (2013.01); *G06N 20/20* (2019.01)

(58) Field of Classification Search

CPC ........ G06Q 20/08; G06Q 20/32; G06Q 20/12; G06Q 20/40; G06F 11/3636; G06F 11/3006; G06F 21/316; G06F 11/3476; G06N 20/20; G06N 20/00

USPC ........................................................ 705/64

See application file for complete search history.

(56) References Cited

U.S. PATENT DOCUMENTS

| | | | | |
|---|---|---|---|---|
| 10,002,348 | B1 * | 6/2018 | Doctor | G06Q 20/401 |
| 11,164,163 | B1 * | 11/2021 | Viidu | G06Q 20/027 |
| 11,544,713 | B1 * | 1/2023 | Hansen | G06Q 20/4016 |

(Continued)

FOREIGN PATENT DOCUMENTS

WO WO 2017/165132 A1 9/2017

OTHER PUBLICATIONS

Enhanced Security or Alternative routing by Laura Towsend (Year: 2019).*

(Continued)

*Primary Examiner* — Zeshan Qayyum
(74) *Attorney, Agent, or Firm* — Wolf, Greenfield & Sacks, P.C.

(57) ABSTRACT

According to one aspect, systems and methods are provided that intelligently automate payment routing. According to various embodiments, the intelligent routing can be augmented with machine learning models that generate an optimal routing of a transaction, wherein for example, the optimal routing can be based on a unique set of circumstances for each transaction. In further embodiments, machine learning models accept payment processing information and circumstance (e.g., payment modality, store location, online payment location, source IP address, payor IP address, merchant IP address, physical presence, intermediary information, merchant information, payment brand, supplier data, among a host of other options) and based on the trained model can generate an optimal path for any particular transaction.

23 Claims, 24 Drawing Sheets

(56) References Cited

U.S. PATENT DOCUMENTS

| | | | | |
|---|---|---|---|---|
| 11,663,568 | B1 * | 5/2023 | Anderson | G06Q 20/405<br>705/39 |
| 2006/0149671 | A1 | 7/2006 | Nix et al. | |
| 2013/0054465 | A1 | 2/2013 | Sakata et al. | |
| 2019/0340589 | A1 * | 11/2019 | Levy | G06Q 20/10 |
| 2019/0342205 | A1 * | 11/2019 | Ur | G06Q 20/027 |
| 2022/0067743 | A1 * | 3/2022 | Wong | G06Q 20/202 |

OTHER PUBLICATIONS

International Search Report and Written Opinion mailed Jun. 30, 2022, in connection with International Application No. PCT/US2022/024258.
[No Author Listed], Deep Dive: Smart Routing and Transaction Success Rates. Pymnts. Jun. 20, 2020. 21 Pages.
Boggs, The Payments Routing Maturity Model. Spreedly Connections. Mar. 3, 2021. 10 Pages.
Townsend, Enhanced Security or Alternative Routing—Why Should Merchants Have to Choose? Mag Insights. Sep. 5, 2019. 2 Pages.
International Preliminary Report on Patentability mailed Oct. 26, 2023, in connection with International Application No. PCT/US2022/024258.
Extended European Search Report dated Jan. 3, 2025, in connection with European Application No. 22788719.7.

* cited by examiner

2000
Transaction data
2002
2004
Authentication decision strategy
2006
Authorization decision strategy
Authentication Recommended?
2008
Yes
No
2010
Authentication
Authenticated?
2012
Yes
No
2018
2014
authorize without authentication data?
No
Failed
2016
Yes
2020

SYSTEMS AND METHOD FOR AUTOMATIC TRANSACTION ROUTING AND EXECUTION

RELATED APPLICATIONS

This application claims priority under 35 U.S.C. 119(e) to U.S. Provisional Application No. 63/173,779, filed Apr. 12, 2021, entitled "SYSTEMS AND METHOD FOR AUTOMATIC TRANSACTION ROUTING AND EXECUTION", which application is incorporated herein in its entirety.

BACKGROUND

In modern commercial architectures, a multitude of payment processing systems, providers, and intermediaries are required to cooperate in order to provide a seamless end-to-end payment processing pathway for consumers. Typically, consumers never see or understand the complexity of the systems, routing, and verifications that are executed as part of a payment or transaction. In this context, a variety of often competing goals are present and can include 1) speed and efficiency for the consumer, 2) identification and prevention of fraud, 3) streamlining processing, and 4) streamlining routing between systems, among a host of other targets. The result of the complexity of these systems and potentially competing goals can be valid transactions failing in execution.

SUMMARY

The inventors have realized that improvements in routing of payment processing can improve the entirety of a payment processing ecosystem, including the various systems and intermediaries who participate in execution of the transaction, as well as for the consumer, payment provider, and any issuer of a payment modality. According to one aspect, systems and methods are provided that intelligently automate payment routing. According to various embodiments, the intelligent routing can be augmented with machine learning models that generate an optimal routing of a transaction, wherein for example, the optimal routing can be based on a unique set of circumstances for each transaction. In further embodiments, machine learning models accept payment processing information and circumstance (e.g., any one or more or any combination of payment modality, store location, online payment location, source IP address, payor IP address, merchant IP address, physical presence, intermediary information, merchant information, payment brand, supplier data, any location information, among a host of other options) and based on the trained model can generate an optimal path for any particular transaction.

According to one aspect, the system determines the most efficient pathway for the routing of a transaction from initiation of a transaction to the ultimate payment processor. In various embodiments, the system captures transaction information, payment process information, and/or context information. The system can use any collected information to determine the most efficient or optimal route, including executing decision logic and effect on and success of the operation, based on any one or more or any combination of: a payment modality; decision logic on merchant requirements; decision logic on payment gateway or payment service provider ("PSP"); decision logic on acquirer requirements; decision logic on network schema (communication architecture, security systems, etc.); decisions logic on issuer bank; and can also include analysis of authorization process and authentication process to derive the pathway with the great success level. In some examples, the system evaluates a plurality of candidate network routing options and target systems (e.g., merchant systems, PSP systems, processor systems, acquirer systems, network systems, issuer systems, authorization and/or authentication systems, etc.) within the analyzed routes to determine the most optimal pathway.

In some examples, optimization of the pathway can include limiting the introduction of enhanced security. The system can evaluate a pathway to determine that enhanced security would likely cause the transaction to fail. In various embodiments. avoiding failed execution limits use of additional computing resource, network bandwidth utilization, processing time, and/or resubmission that would be necessary for valid but failed operations. In some examples, the system can determine that another pathway is more efficient based on introduction of enhanced security approaches enroute. Various embodiments employ trained models to evaluate a multitude of network routing options, intermediary systems, requirements associated with the intermediary systems, jurisdictional requirements (e.g., triggered based on a selected route), and other triggers that may introduce additional computational burdens or complexity on a given route. In further embodiments, rule based decisions can be implements to select optimized routes. The rule based decisioning can augment machine learning ("ML") models, and various integrations of ML and rule based approaches can be implemented to identify an optimal route.

In some embodiments, the machine learning models are trained on data that is consumer agnostic—meaning no information specific to the consumer is required to identify the optimal routing path (e.g., the routing that will result in highest probability of a successful execution, for example, with fewest computational resource, bandwidth, and/or processing time), rather other factors are used to train machine learning models to recognize problems and avoid them. In still other embodiments, the intelligent routing machine learning models can also employ information on consumers to further optimize routing and/or execution. Hybrid machine learning models and/or multiple model implementation can leverage both types of analysis to generate an optimal payment routing. Additionally historic analysis and rule based selections can be used in conjunction with machine learning to further tailor route selection.

According to another aspect, the intelligent routing system can determine in real time and one or more or any combination of the following: the best payment method to be used by the user/consumer, the optimal processor/acquirer to process the transaction to get the highest chances that the transaction result will be successful, predict whether applying "3D Secure" ("3DS") on a given transaction improves the likelihood of getting a successful transaction result (e.g., the system is configured to predict, for example, if the consumer will abandon the 3DS process resulting in a failed transaction even for valid transactions), predict if the consumer will fail a 3DS check, predict what payment method (e.g., specific card (e.g., VISA, MC, gift card, etc.)) or specific payment method (e.g., PAYPAL, KLARNA, IDEAL, etc.) results in the greatest likelihood to complete a successful transaction, among other options.

In further aspects, intelligent routing can also include automating/intelligently determining how to handle declined transactions. For example, machine learning models are trained on transaction operations and historical information, for example, to output the best way to handle a transaction in case it is declined in order to provide the highest probability that the transaction will be recovered and processed successfully. In some embodiments, the models that automatically handle processing can be configured to determine that one or more or any combination of the following options will result in the greatest likelihood of a successful retry: automatic retry using another processor/acquirer, automatic retry using 3DS (e.g., invoking 3DS when frictionless (e.g., does not require the consumer's participation)), automatic retry using 3DS including presenting enhanced security requirements to the consumer, provide recommendations to the user that can include trying a specific payment method, resolve with its bank via SMS/phone (e.g., automatically generate text for user approval), identify a lower amount likely to be successful, among other options. Of note, 3DS is one of various security enhancement protocols/measures (e.g., deciding to add CVV information or not to downstream processing) that can be invoked or accessed during payment processing. Further embodiments include intelligent models executed by the system that predict which enhancement can or will be used, and leverage each of the security enhancements to deliver the greatest likelihood of a successful transaction for valid requests. In still other embodiments, the system is uniquely capable in identifying what information should be used in an optimal route. For example, the system is configured to identify when a credit card submission for payment includes an address that does not match an address on file. By identifying the discrepancy, the system can modify the information provided downstream to remove the inconsistency and improve the likelihood of successful processing.

According to one aspect, an intelligent routing system is provided. The system comprises at least one processor operatively connected to a memory, the at least one processor when executing configured to: accept as input to at least one machine learning model information associated with an initiation of a transaction; evaluate with the at least one machine learning model a plurality of processing routes for the transaction, wherein the plurality of processing routes includes a network of computer systems each of which is arranged to process aspects of the payment transaction; return as output a probability of executing the transaction successfully associated with at least one processing route of the plurality of processing routes for the transaction; and based on the output probability meeting a threshold, select and trigger the transaction to use the at least one processing route.

According to various embodiments, system includes any one or more or any combination of the following so: the at least one processor is further configured to analyze security options for the plurality of processing routes to determine the at least one route having a highest probability of success; the at least one processor is further configured to determine the at least one route having the highest probability of success based on evaluation of enhanced security protocols for each processor, payment method, intermediary, and acquirer system of the plurality of routes; the at least one processor is further configured to determine enhanced security protocols negatively impact successful operation; the at least one processor is further configured to select an alternative routing to eliminate enhanced security protocols; at least one processor is configured to: determine short term analysis of the plurality of processing routes disagrees with the at least one machine learning model, dynamically weight the short term analysis such that selection and execution of the transaction using the at least one processing route is based on the short term analysis; the at least one processor is configured to adjust the weighting of the short term analysis based on the observed execution of the at least one processing route; the at least one processor is configured to: based on a plurality of output probabilities meeting the threshold, select and execute the transaction using a respective one of a plurality of processing routes having the greatest probabilities of returning a successful transaction; the at least one machine learning model is trained on historical payment information; the historical payment information includes attributes specifying at least one or more of geographic information, payment user's device, connection details, and an aggregated reputation of the transaction; the at least one machine learning model is trained to output the probability of executing the transaction successfully based on an evaluation of a plurality of processing system included in a processing route; the at least one machine learning model is trained to output the probability of executing the transaction successfully based on prior knowledge of payment user's actions; the at least one machine learning model is trained to output the probability a payment user will respond positively to an enhanced security challenge; the at least one machine learning model is trained to output the probability of executing the transaction successfully based on prior knowledge of behavior or preferences of similar payment users; the at least one processor is configured to generate a plurality of candidate routes for executing the transaction; the at least one processor is configured to evaluate a respective route based on the probability that a respective merchant processing triggers enhanced security requirements.

According to one aspect, a computer implemented method for intelligent routing is provided. The method comprises accepting, by at least one processor, information train on transaction information associated with an initiation of a transaction; evaluating, with at least one machine learning model executed by the at least one processor, a plurality of processing routes for the transaction; returning, by the at least one machine learning model, an output of a probability of executing the transaction successfully associated with at least one processing route of the plurality of processing routes for the transaction; and selecting and triggering, by the at least one processor, the transaction using the at least one processing route based on the output probability meeting a threshold.

According to various embodiments, system method includes any one or more or any combination of the following so the method further comprises: analyzing security options for the plurality of processing routes to determine the at least one route having a highest probability of success; determining the at least one route having the highest probability of success based on evaluation of enhanced security protocols for each processor, payment method, intermediary, and acquirer system of the plurality of routes; determining enhanced security protocols negatively impact successful operation; selecting an alternative routing to eliminate enhanced security protocols; determining short term analysis of the plurality of processing routes disagrees with the at least one machine learning model, and dynamically weighting the short term analysis such that selecting and triggering of the transaction using the at least one processing route is based on the short term analysis; and adjusting the weighting of the short term analysis based on the observed execution of the at least one processing route.

According to one aspect, a method of routing a payment transaction request through a network of computer systems each of which is arranged to process aspects of the payment transaction so as to achieve execution of the transaction is provided. The method comprises: receiving as input a plurality of parameters representing the transaction request; defining a plurality of different routes available for the transaction request through the network of computer systems so as to achieve execution of the transaction; using a trained machine learning model to calculate, for each different defined route through the network, a likelihood of the transaction (e.g., achieving/failing to achieve) execution; selecting one of the routes using the calculated likelihoods, and routing the transaction request through the network using the selected route. According one embodiment, the method includes analyzing respective routes based on at least one of different types, different classes, or different entities of the networked computer systems pr different classes of or particular ones of specific information contained in the transaction request.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

Figure 1:
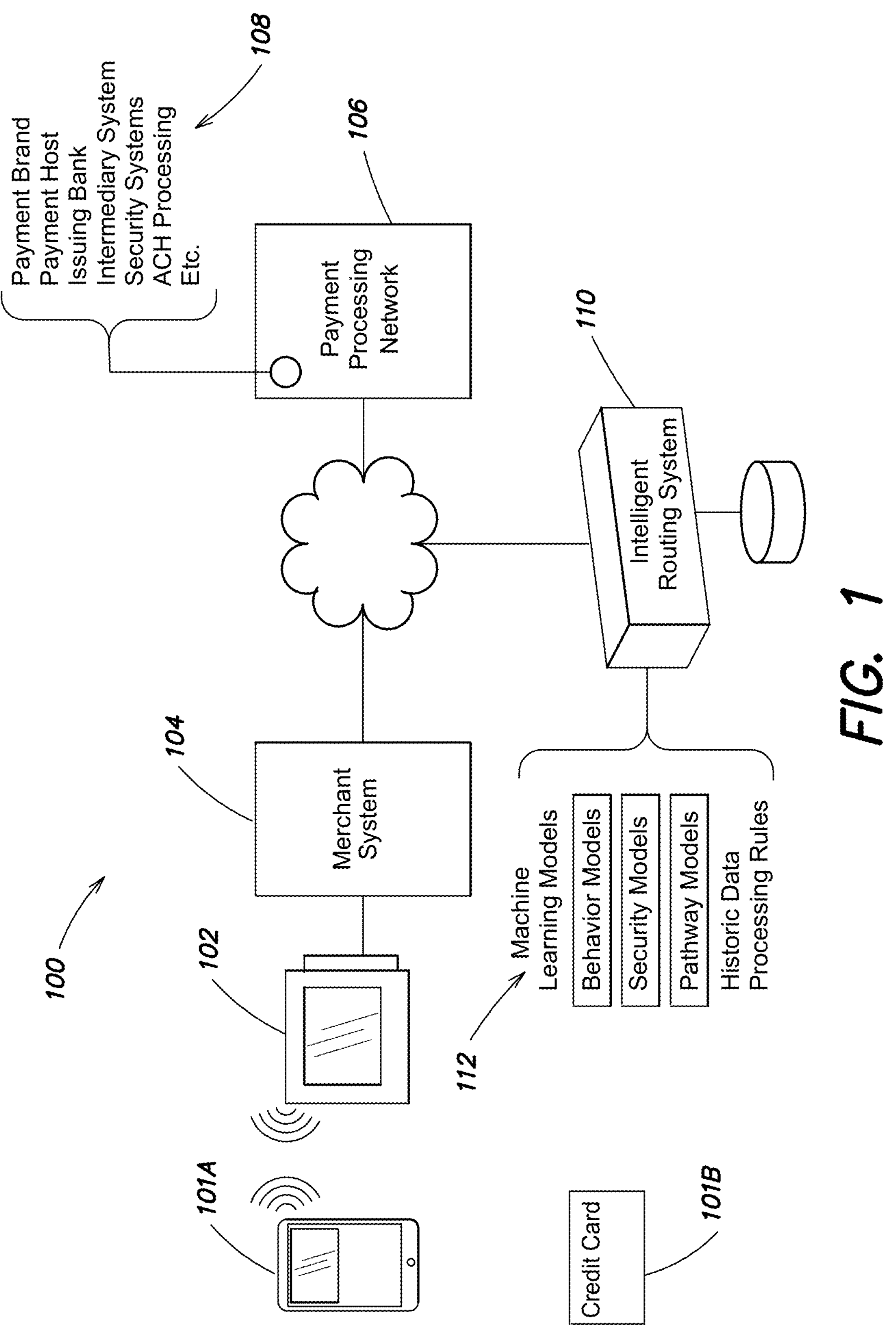
FIG. 1 is a block diagram of an intelligent routing system, according to one embodiment.

As discussed, an intelligent routing system can be configured to coordinate transaction routing across a multitude of computer systems and/or networks to deliver the highest likelihood of successfully processing valid transactions. Further embodiments, enable the system to minimize computational complexity associated with various routes. In various embodiments, routing of transactions can include operations to select specific payment modalities (e.g., credit card, credit card brand, payment service, gift card, digital wallet service (including, for example, APPLEPAY, GOOGLEPAY, KLARNA, AFTERPAY, etc.), coin processor, etc.) that improve the likelihood of a successful valid transaction. Further, intra-system routing selections can likewise improve the likelihood of a successful valid transaction while optimizing the efficiency of route, and even decisions on what information to provide (or not) to downstream processors can be utilized by the system to improve the likelihood of success of a transaction. In some examples, the routing system is configured to tailor a processing route to avoid security enhancements (e.g., based on machine learning prediction that a security enhancement session will impose additional burden without benefit or even trigger the user to abort the transaction), and in other examples, the routing system is configured to predict a valid transaction will fail absent security enhancement and triggers (e.g., reducing the efficiency of the system by requiring re-execution), for example, a 3DS confirmation to increase the determined likelihood of success.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element, or act herein may also embrace embodiments including only a singularity. References in the singular or plural form are not intended to limit the presently disclosed systems or methods, their components, acts, or elements. The use herein of “including,” “comprising,” “having,” “containing,” “involving,” and variations thereof is meant to encompass the items listed thereafter and equivalents thereof as well as additional items. References to “or” may be construed as inclusive so that any terms described using “or” may indicate any of a single, more than one, and all of the described terms.

FIG. 1 is an example block diagram of an intelligent routing system and environment 100. Payment processing environment can exist in many forms, including for example, a physical merchant store and payment processing systems (e.g., 102 payment node and 104 merchant payment system, etc.), as well as online interfaces (not shown) that accept and process any valid form of payment or payment option (e.g., APPLE PAY 101A or credit card 101B). Payment node 102 can include any form of payment acceptance device (e.g., swipe reader, contactless payment, etc.) and associated merchant system (e.g., 104) to communicate with a payment processing network 106. The payment processing network can include a multitude of systems, and/or participants, including for example, payment brands, payment hosts, issuing financial institutions, intermediary systems, security systems, ACH processing, etc. (e.g., 108).

In response to a transaction trigger by a merchant system and/or online processing system, the intelligent routing system 110 is configured to analyze the circumstances for the transaction. In various embodiments, determining that a transaction is likely to be valid is used a gateway to further optimization. The inventors have realized that improving the likelihood of success of a transaction can be reserved to cases where the risk of an invalid transaction is low. Determining the risk of an invalid transaction is low can include value assessments, evaluation of fraud characteristics, etc.

According to some embodiments, the system can be configured to include analysis of a variety of persona characterizations of a user trying to accomplish a transaction. In various embodiments, machine learning models are trained on persona characteristics from a body of valid transactions to determine that the transaction is valid. The system can then determine an optimal routing of transaction to achieve the highest probability of successfully completing a valid transaction, and for example, while balancing the execution load imposed by the selected route. In further example, the system is configured to balance availability of enhanced security measure/systems. According to one example, the system can determine in real time, availability of 3DS systems or ACH systems for a processing route. While an initial determination may have selected a route that employed ACH to improve the likelihood of success, the system can determine that ACH system unavailability will actually result in failure, and re-route to a different processor, or substitute another security approach (e.g., 3DS protocol with exemption), among other options.

In various embodiments, the system 110 can include behavior based models which incorporate persona characteristics associated with how a known valid user behaves. Further models can be trained on how known invalid or fraudulent users behave, and still others can be trained on data that incorporates known valid and known fraudulent users and associated information. In one example, the system can include classifier networks that analyze a given transaction and classify behavior characteristics as matching or not matching valid user behavior, and/or that output a likelihood a transaction is valid.

In another example, the system 110 can include neural networks that are configured to identify fraudulent or improper transactions as outlier transactions, so that transactions not flagged as outliers can be expedited with confidence. In further example, outlier identification can be used to determine that further security operations would increase the likelihood of a successful transaction. In the alternative and/or in another embodiment, machine learning models can analyze a given transaction to determine if enhanced security protocols will be triggered, and what effect that will have on the transaction, and routing efficiency. For example, a behavioral model can predict that a given user will not complete an enhanced security challenge (e.g., 3DS, etc.) and abandon a valid transaction if required. The system can route the transaction to avoid triggering the enhanced security reducing the burden for executing a given communication route, for example, by requesting the user select a different payment modality, by routing the processing according to a new transaction pathway, etc. Shown at 112 are some example machine learning models that system 110 can leverage to provide an optimal routing of a transaction. The models include behavior based models for users and/or user personas, which can be used to define and classify, for example, entities which represent a collection of attributes relevant to transaction analysis. Risk models can be executed to deliver predictions on whether enhanced security functions increase the probability of a successful valid transaction, and/or are needed as part of the payment protocol path. Pathway models can be executed to analyze how various transaction pathways affect likelihood of a successful transaction (e.g., which network route, selection of payment processor to institution communication path impact likelihood of success, etc.), including for example, likelihood of triggering enhanced security, likelihood of enhanced security improving chance of success, etc., balanced against cost/availability of the enhanced security.

In further example, security models can also be configured to predict how a given user will react to the requests for security enhancement (e.g., abandon transaction, complete current transaction, as well as downstream effect (e.g., predict reduced likelihood to use merchant and/or payment service based on enhanced security protocols, etc.)), and leverage such predictions in determining an optimization of communication efficiency/security level.

In some examples, machine learning models are trained on captured transaction information. In further example, the system employs machine learning models that are trained to analyze routing decisions to take risk score/decision as a factor. For example, the system can use the models to determine if a specific PSP will block a higher risk transaction whether not or an issuer receiving transaction from an acquirer from specific country is likely to block a transaction. The system can identify different routings, and selections of systems, where another route makes the transaction likely to succeed.

Various system embodiments can implement machine learning models that are configured to perform any one or more and any combination of the following: predict the best payment method to be used by the user; predict the most fit (e.g., highest likelihood of a successful transaction to reduce re-try bandwidth consumption) processor/acquirer to process the transaction (e.g., limiting processing required for security enhancements); predict whether applying enhanced security (e.g., 3DS) on transaction will improve likelihood of a successful transaction result (e.g., limiting retry or subsequent communication on failure of the transaction); predict if the consumer will abandon the 3DS process (e.g., allows the system to balance enhanced security against likely human based failure of pathway or predicted failure to correctly respond, among other options); predict if the consumer will fail 3DS; predict what payment method (e.g., specific card or specific payment method such as PayPal) has the greatest likelihood to get the consumer to complete a successful transaction; predict the best way to handle the transaction in case its declined in order to recover it and process it successfully (e.g., evaluate and select from automatic retry via another processor/acquirer, automatic retry using enhanced security (e.g., 3DS), and for example, only when 3DS is frictionless only (does not require the consumer participation); automatic retry using 3DS— with authentication challenges to the consumer, etc.); generate a recommendation to the user (e.g., try a specific payment method instead, resolve with its bank via SMS/phone (e.g., automatically generate an SMS message address to bank/issuer)), recommend a lower amount for payment, etc.

In further embodiments, the machine models can be trained on any one more of the following factors: historical statistics (e.g., authorization rate on the issuer level and acquirer level on specific same risk level/segment); history of the specific user (e.g., related to acquirer used, payment method used and to successful completion of 3DS); purchase intent (in some embodiments the system is configured to analyze each transaction for a user (e.g., single user, group of users, similar users, etc.) as at least part of determining a payment intent, which enables the system to recognize a new transaction attempt (e.g., when there was a failed attempt for the same intent), and treat the new transaction accordingly (e.g., re-route, new payment method, etc.) to avoid another failure); risk—for example, the system can be configured to avoid entering card scheme fraud programs if there is a reduced likelihood of success; merchant policies—such as minimum volume commitments; fees—minimizing the transaction fee during execution; issuer availability (e.g., the level of support of 3DS and the current up-time of the vendor); and network effect from other merchants, among a number of other options. According to some embodiments, the system is configured to develop operational models based on "Intent"—a unique linking protocol that can connect between attempts of purchasing by the same individual across multiple devices, across different accounts, across different payment methods, and across different network connections. In some examples, the system is configured to build an intent based model where the system detects that the individual was not able to complete a purchase, and what subsequent actions or change in circumstance permit the transaction to be executed. According to various embodiments, the trained models are used in evaluating the efficiency of various communication pathways from an initiator, through intermediary systems, to a payment issuer, enabling the selection of the most efficient communication path and successful execution.

Some embodiments can include system options to enable routing points (e.g., intermediate systems (e.g., merchants, acquirers, processors, etc.)) to favor routing selection or options as part of optimized routing. In one example, the system can provide a merchant compass (e.g., a merchant can influence the level of any number or combinations of key performance indicator "KPI" (including, for example, provide a weight for fees vs authorization rate vs commitment, among other options, increased security balanced on computational efficiency, etc.). In other embodiments, issuer data (e.g., example end points of communication route) can be used to train machine learning models that optimize routing and reduce the possibility an issuer will reject the transaction (e.g., due to risk), and thus require additional or subsequent communications.

Figure 2:
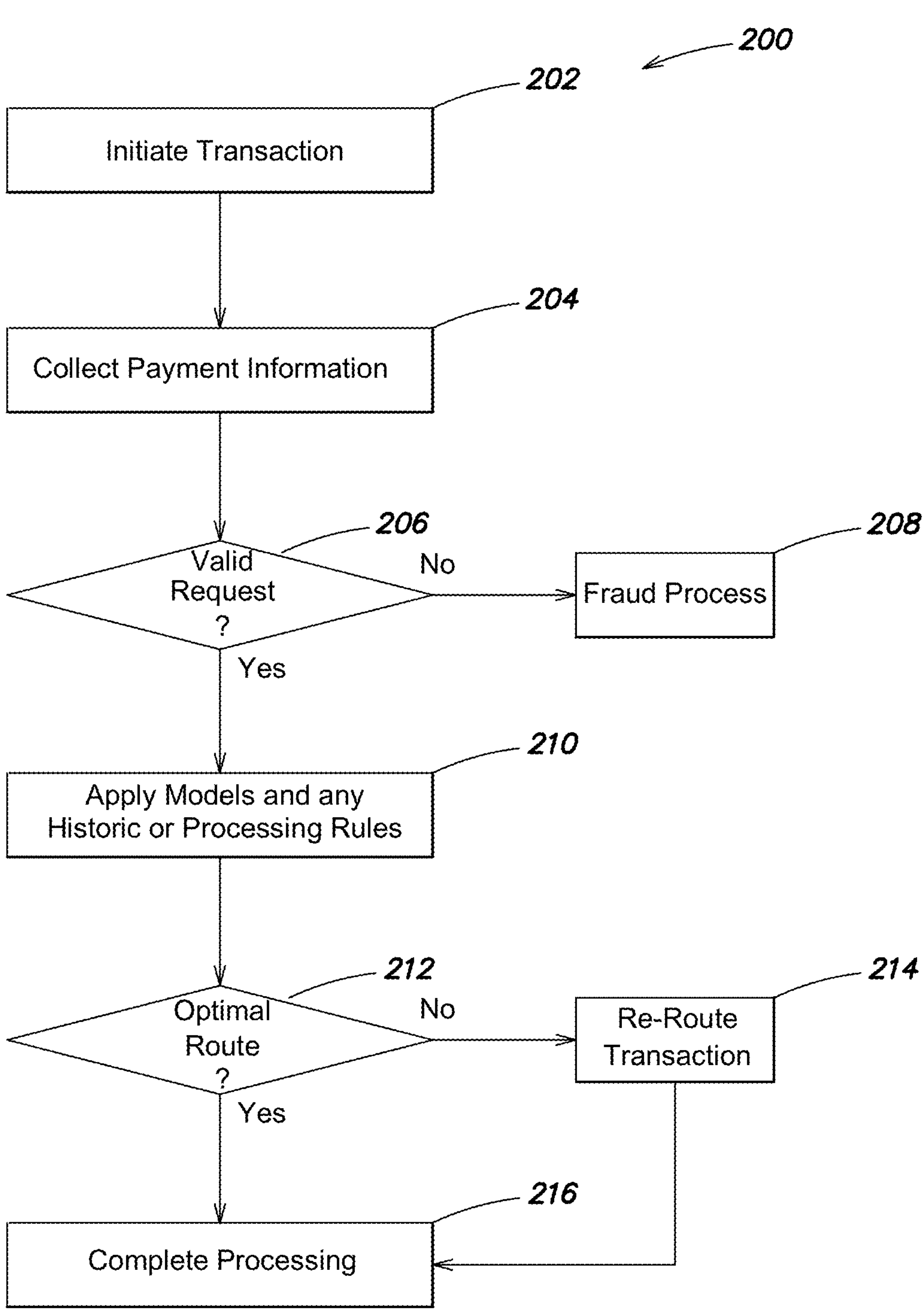
FIG. 2 is an example processing flow for intelligently routing a transaction, according to one embodiment.

FIG. 2 is an example process flow 200 for intelligent routing of a transaction. Process 200 can begin at 202 with initiation of a transaction. As discussed, any payment methodology can be used to initiate the transaction in question and the circumstances of the transaction request can be communicated for further analysis and/or optimization. At 204, process 200 continues which capture of payment information, including all the details associated with the transactions (e.g., originating location and/or IP address, merchant locations and/or IP address, amount, product, payment modality, payment brand, user persona information, etc.). Once payment information has been captured, process 200 can continue with a determination if the transaction request is valid 206YES or not 206NO. For example, payment information can be analyzed by machine learning models to determine if the information matches fraudulent classifications. If the analysis determines that the transaction is invalid, fraud processes can be triggered (e.g., at 208). In some examples, fraud processing can include updating machine learning models based on collected activity or indicators.

If the transaction is determined valid 206YES, process 200 continues at 210 with analysis of the payment information. In some embodiments, analysis can include execution of one or more machine learning models to determine an optimal routing of the transaction that yields the most efficient communication route which can also include a route with the highest probability of returning a successful transaction. In various examples, the most efficient communication route can be based on the route with highest probability of returning a successful transaction because the goal limits the number of retries and re-communications. In various executions, that system can deliver a better experience for the user by optimizing the processing route for likelihood of success. In some examples, optimizing for the likelihood of success effectively reduces the computational burden on the entire communication network. In further embodiments, the machine learning models can return a number of routes and associated probabilities of returning a successful transaction. In some settings, payment processing participants can set weights or values on certain pathways (e.g., least expensive, shortest network traversal, least number of third party systems, minimizes additional security/computational burden, success rate, commitment, etc.) which are then used to select the optimal routes, which can include additional factors beyond likelihood of success. Analysis at 210 can also include historic analysis and/or processing rules that impact the determination of an optimized route (including, for example, likelihood of success, processing burden, etc.) or that are implemented to weight selection of specific routes, which can be used to permit new dynamic routing selections. If a candidate route is not optimal for returning a successful transaction 212NO, process 200 continues at 214 with dynamic routing or re-routing of the transactions to deliver the highest likelihood of success, improved efficiency, etc., and processing can be completed at 216. If a candidate route for the transaction is optimal 216YES, the processing for the transaction is completed at 216. According to various embodiments, the steps of process 200 can be executed in different order and/or various steps omitted or consolidated for execution.

Figure 3:
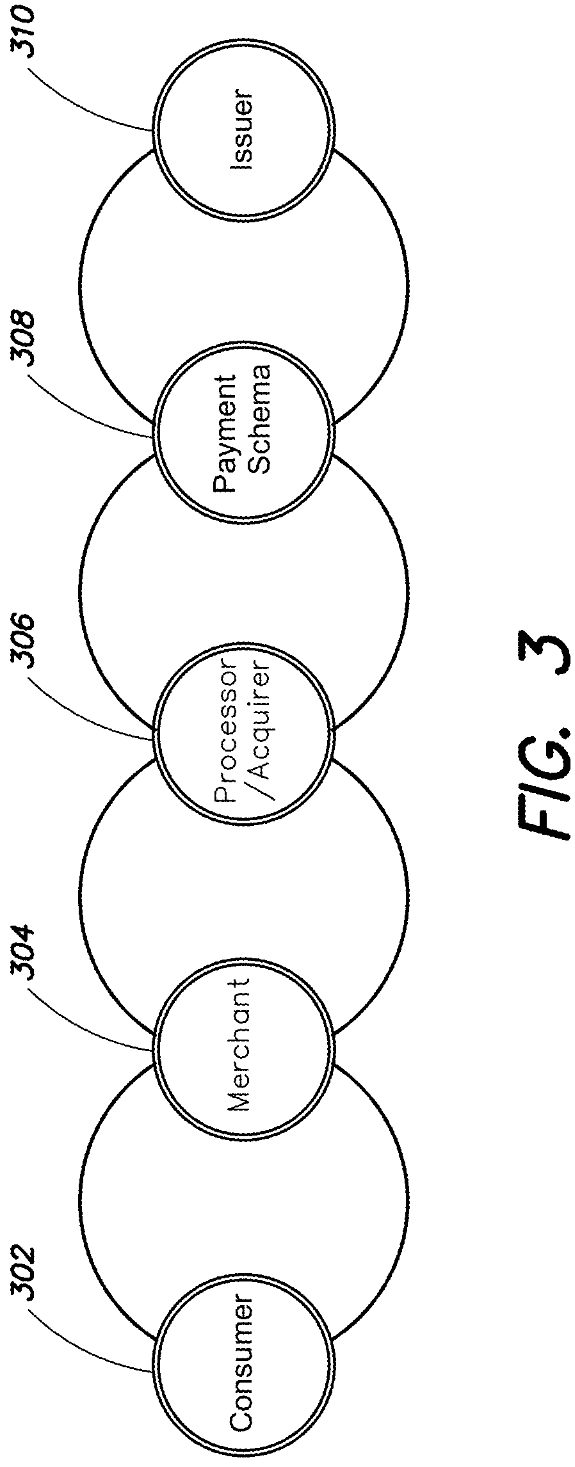
FIG. 3 is a block diagram of an example transaction routing, according to one embodiment.

FIG. 3 is a block diagram of an example transaction routing flow. Shown at 302 is a consumer who initiates a transaction with the merchant 304. Payment processing can be handled by a processor/acquirer at 306 and the payment schema at 308 (e.g., payment brand, card, service, etc., and any rules (discussed in greater detail herein) communicates to her respective issuer at 310. In conventional approaches, the execution from consumer 302 to issuer 310 and back again occurs autonomously and with a known rate of failure (e.g., even failed valid transactions). By optimally re-routing the transactions through merchant 304, processor 306, payment schema 308, and issuer 310 intelligent routing systems can reduce the number of failed valid transactions thus improving the operation of the payment ecosystem over conventional implementation. In some examples, improved operation targets and implements reduced network bandwidth utilization (e.g., based on limiting re-transmission need and/or eliminating re-tried communication), elimination of enhanced security protocols and associated processing, dynamic routing based on routing node criteria, etc. In further embodiments, ensuring valid transactions are processed correctly in the first instance reduces the impact on the processing ecosystem, for example, based on the impact imposed by re-presenting valid transactions, among other options.

Figure 4:
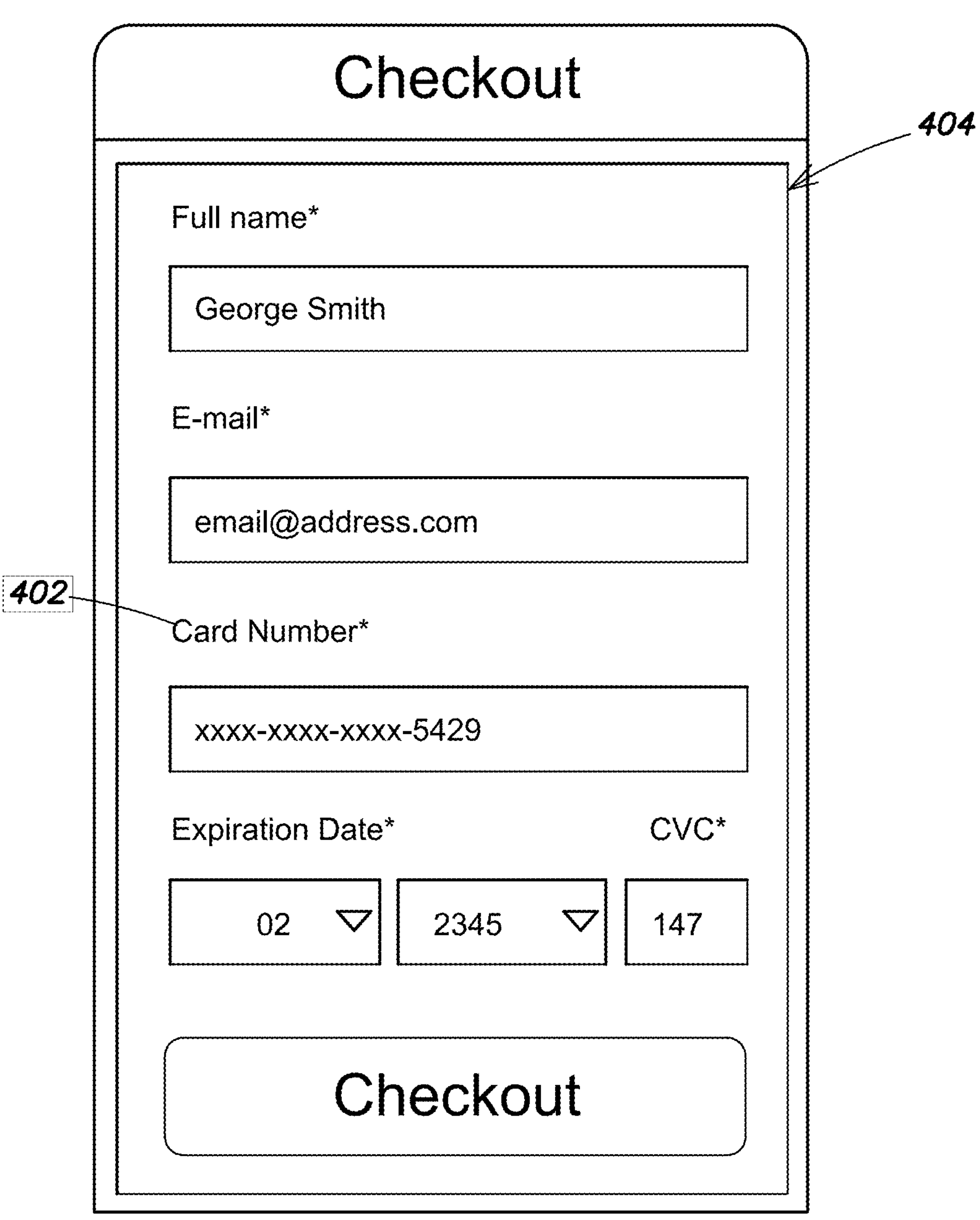
FIG. 4 is an example interface for triggering or recommending optimized routing, according to one embodiment.

FIG. 4 is an example screen capture of a payment interface that can be used to collect payment information and to begin a transaction. In some examples, once the user begins to input information into a checkout or payment screen (e.g., as shown in FIG. 4), the intelligent routing system can begin processing payment information to determine an optimal routing. In some examples, the system can provide recommendations to a user on what card to select to achieve the highest probability for a successful transaction.

For example, at 402, the system can provide information to a user by highlighting a card from the selection interface or providing a short name of a credit card record for user selection, among other options (not shown). In further embodiments, the intelligent routing system is configured to optimize the routing of the transaction once checkout is selected in the interface at 404.

In some embodiments, the system can analyze any number of communication paths between the initiation of the transaction and an end point issuer associated with a payment modality. In further embodiments, the system can analyze all the payment modality pathways as well as the potential routes for intermediate systems to derive the most efficient routing. In further embodiments, the system is configured to provide routing recommendation when a payment method is entered into any on-line form. In various examples, the system is configured to determine optimal routes whenever payment information is submitted, including the checkout example shown in FIG. 4.

Efficiency analysis can be tuned to favor limiting enhanced security protocols where they reduce the likelihood of success (and their associated computing burden, extra communication requirements, etc.), limiting retries on valid requests by improving the likelihood of initial success (e.g., reducing the communication and computations required for reprocessing valid but rejected attempts—including limiting human induced failure (and any retry) for lack of response on enhanced security protocols), tuned to favor enhanced security to ensure a singular completed routing operation (e.g., wherein enhanced security will improve execution efficiency (e.g., when balanced against additional computation, processing, etc.)), among other options.

Figure 5:
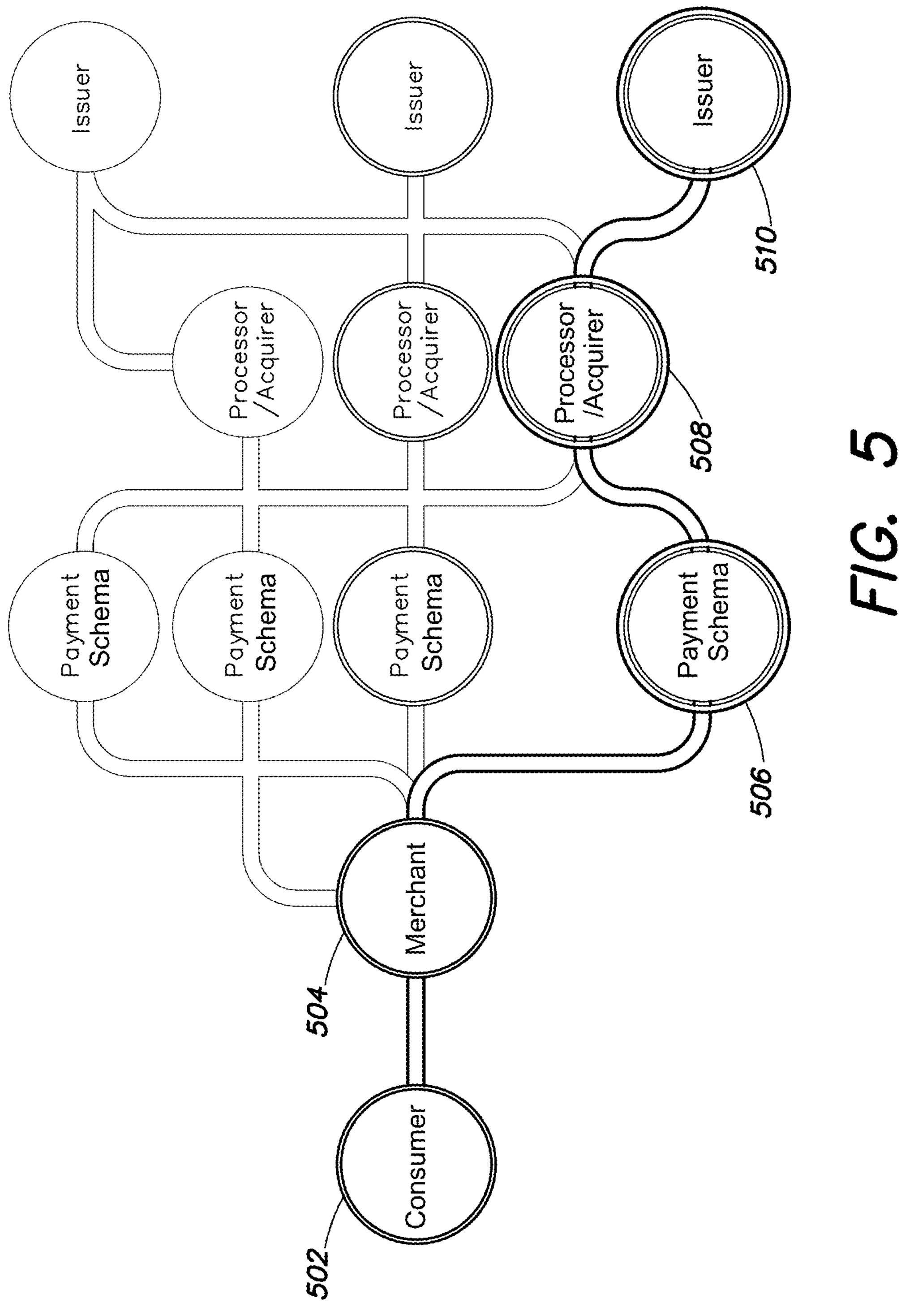
FIG. 5 is an example transaction routing and environment, according to one embodiment.

Shown in FIG. 5 is an example diagram of a processing route for transaction. As shown, the consumer 502 can initiate a transaction with a merchant 504. In some examples, the consumer 502 can select a payment schema 506 (e.g., payment brand/card, payment service, processing rules (discussed in greater detail below) and the system can optimize a route to a processor/acquirer at 508 and then to an issuer 510. In other examples, the routing system can suggest a payment brand (e.g., 506) as part of an optimized route to a processor 308 and issuer 510.

Figure 6:
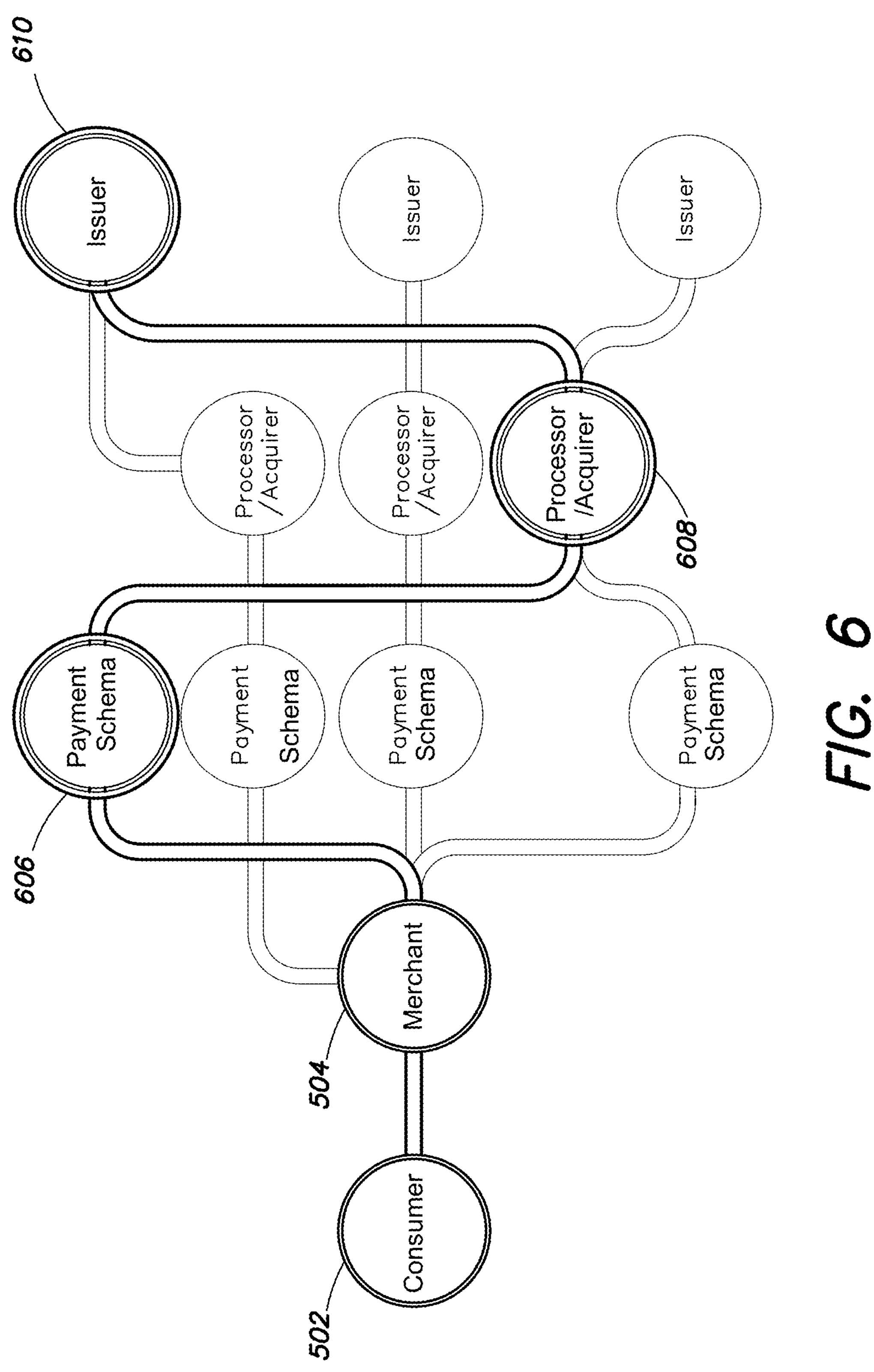
FIG. 6 is an example transaction routing and environment, according to one embodiment.

FIG. 6 illustrates another pathway the transaction may take. For example, the consumer 502 may initiate a transaction with the merchant 504 and the routing system can determine that the pathway shown in FIG. 5 is sub optimal or even likely to result in a failed valid transaction. In such settings the routing system can be configured to suggest or select a different payment schema (e.g., 606) that can still go through the same processor (e.g., 608), but a different issuer (e.g., 610). Each branch and participant involved in the execution illustrates an opportunity for the routing system to optimize a selected branch for returning a successful transaction. As discussed, various pathways can be weighted to adjust optimal routing to include additional factors (e.g., fees associated with branch or leg, shortest network traversal, least number of third party systems, success rate, commitment, etc.).

Various embodiments of the intelligent system can include a plurality of processing engines. The plurality of processing engines are configured to evaluate transaction information to determine an optimal decision and processing route for likelihood of success. In some examples, each decision by respective processing engines is configured to optimize the likelihood of success specific to that engine. The various optimization decisions can be combined by the system to determine a route for executing a transaction that begins with a merchant transaction, proceeds through a payment gateway or PSP, a processor, an acquirer bank, and includes a network schema (e.g., verification systems requests), issuer bank, and ACS for 3DS (an Access Control System is an example security system). In some examples, the system evaluates each routing option and builds a pathway that provides the greatest likelihood of success.

In determining likelihood of success, the system can be configured to execute various machine learning models and/or processing rules. The models and processing rules can be derived from historic transaction information, successful, and/or failed executions. Further, the model and processing rules can be derived from intent based analysis of historic transactions. For example, intent linking of transactions enables the system to evaluate multiple attempts at a purchase based on intent and evaluate how changes to transaction information enable a successful result. Similarly, the system can train machine learning models for each decision point in a processing route to determine a selection of systems, a selection of information to pass to the various systems, and/or a selection of security protocols to engage or avoid during processing to achieve the highest likelihood of success. In various embodiments, the decision points within a processing route include the respective participant systems, opportunities to trigger or avoid additional security measures, and also include opportunities to filter, enhance, or format transaction information passed to the various participant systems, among other options.

According to various embodiments, the processing engines can use processing rules, machine learning models and various combinations of the same to determine the optimal routing. Regardless of the specific configuration of the processing engines and/or system, the evaluation begins with a transaction, and for example, a card not present transaction. In one example, a merchant can initiate the transaction or the customer can trigger the transaction via a web interface, for example.

Once the merchant submits a transaction, the expected processing route includes a payment service provided ("PSP"). A PSP can be a payment service provider or a payment gateway. The PSP can also be a processor. In various examples, the PSP is a separate entity, however in other examples, the PSP and processor can be the same entity and on the same systems. Next in the route is a processor and subsequently an acquirer bank. A processing route can include a network scheme including various security systems that provide additional information or verifications during processing.

Typically, the processing route is bi-directional from merchant to issuer bank and back again with the transaction result. Various embodiments of the system are configured to influence the likelihood of success at each of the systems along the processing route which are associated with the parties that evaluate a transaction to approve success. The system is configured to predict for each of the processing entities what rules apply for evaluation of a transaction and how the system can ensure compliance with them, for example, by applying routing policies that comply with the predicted rules.

For example, given a first acquirer bank the system can derive a processing rule that the first acquirer will evaluate—and determine that a CVV must be present to succeed. Given a transaction without a CVV, the system can automatically determine a new route with a second acquirer that will accept a transaction without a CVV. This system can also determine that a new PSP selection is needed to access a route with the second acquirer. In further example, the system can evaluate a purchase at a first merchant identified by a first merchant identification number ("MID") and determine a low likelihood of success. In various examples, the first merchant may be associated with multiple MIDs. Evaluating a route using a different MID for the first merchant under the same conditions can identify a significant increase in likelihood of success. The system can automatically recommend the use of the different MID, or if further embodiments tailor the information presented to downstream processing entities based on the improved likelihood of success.

Stated generally, processing requirements for the first merchant and MID would prohibit the transaction information from success, where the processing requirements suing the second MID are more permissive. In another example, a processor may have a rule that establishes that if a customer supplied address is not matching an address for the customer that they have in their system, the transaction will be rejected. Another processor may have the same rule but only for transactions over a threshold value. Various system embodiments can process those contexts to determine a transaction with mis-matched address information should go to the later processor. In another example, the system can determine that it should not pass address information along to either processor, this enables the system to determine a route to avoid a rule being applied on a mis-matched address even for the first processor, among other options.

In other embodiments, the system can leverage the capability of having transactions approved (authorized) without requiring authentication (e.g., enhanced security protocols). Further, the system can also leverage the ability of a customer to provide extra security indication(s) to the merchant or downstream entities/systems—e.g., the bank or the processor or the network scheme, the issuer bank, can approve the transaction because the system enabled a different route and included new information or extra security indications. Many conventional approaches do not try to learn what happened, what worked, and what did not work to develop rules and/or models of how to optimize a route for future transactions. Moreover, many conventional implementation fail to leverage that analysis to advise or select routes or even modify the information presented to the participating systems based on similar patterns for future transactions and/or for other people. For example, the intelligent routing system can select the information to present to each participant, tailoring the data presented at each decision point/system. In one example, this results in different information selections for a merchant, processor, acquirer, issuer, etc. Optimal routing can even determine that multiple attempts will increase the likelihood of success for a transaction over time. In these settings, the optimization of the processing route yields a successful transaction that would otherwise fail—because, for example, the issuer can reward a user as legitimate for a user that keeps trying a transaction versus a user who gives up.

In some embodiments, the system is able to resolve inconsistent or poorly defined error messaging. For example, each participant system in a processing route can provide information indicating a transaction failure. As the transaction information is routed back to an initiating merchant, the actual reason for failure can be obscured or lost (e.g., messaging "do not honor"). The system is configured to resolve inconsistent and even inexplicable messaging by tracking what circumstances caused a failure, and what changes or other context permitted a success. The system leverages that information for each participating system or option within a route to deliver the optimized route having the greatest likelihood of success. In one example, an ambiguous error can be returned from a failed transaction—"Error 600." Each participant/system in the route, merchant, gateway, processor, acquirer, network architecture, issuer, can have updated, altered, or inserted the error code. The system can evaluate the code and circumstances under which the transaction was rejected to identify similar executions, and further identify resolutions for those circumstances.

In further embodiments, the system can determine that providing additional authentication information (e.g., enhancing security) will result in a successful transaction (e.g., initially or as a re-submission). The system can also determine that going straight to authorization (skipping or not using even valid authentication information) based on a location or transaction source, a device being employed by a purchaser, etc., improves the likelihood of success.

In the context of enhanced security protocols and/or regulated environments, there are cases that the system can ask for exemption. In some embodiments, the transaction is treated under enhanced security protocols but does not trigger additional authentication requests. When the system requests an exemption as part of the processing route, the system can determine that an exemption requests is required for the payment gateway. This can trigger the payment gateway system to ask the processor system. Each system in the processing route can trigger an exemption request to downstream systems until the acquirer or issuer system accepts the exemption request. The routing system is configured to check the constraints for each participating system in the processing route and confirm the exemption will be allowed. In some examples, the system employs statistical models and/or machine learning models to see what kind of transactions and risks those systems will allow. By modelling how an exemption request is treated by each system, for example, based on transaction amount, the system can determine how all the systems in the chain will treat the exemption request and thereby determine its effect on an optimal route.

Pre-authorization fraud evaluations can also be used to improve transaction success. For example, by evaluating a transaction against fraud indicators the system can pass information on a validity check to downstream processors (e.g., payment gateway, acquirer, issuer bank, etc.), and may use targeted selection of transaction information in further processing to improve the likelihood of success for the transaction.

According to various embodiments, the system models each system/participant on a route as processing nodes (e.g., merchant, PSP, processor, acquire network, issuer or bank) that each have options tailored to their preferences and/or rules. The models can be configured to output selections of transaction information for each system/processor to account for the tailored rules that may apply, customizations in processing, and the system can change or manipulate how the rules are going to result in a decision at each one of those points. In some embodiments, the physical device being used by a purchaser can affect the likelihood of success of a transaction. In one example, the screen size of a mobile device can limit the user's ability to correctly respond to a CAPTCHA and/or authentication requests. In another example, a device may not display the authentication check correctly, which would result in a failed valid transaction. Where the system determines that the user is not likely to complete the request successfully (e.g., based on their device), the system can re-route to avoid the enhanced security or recommend a different payment modality (e.g., PAYPAL versus credit card) to avoid the issue entirely.

In still other embodiments, the system is configured to anticipate changes in processing at any one or more of the participants/systems. For example, a merchant may change processing rules without any notification. In various embodiments, the system identifies any failed transactions and updates the models accordingly. Further, the system can use short term histogram analysis to adjust for the changes in processing in real time. Real time effects can also include the availability of systems within a processing route. For example, authentication may be managed by ACS systems. If a processing route requires an ACS check, and the ACS system itself is offline, the system can adjust a processing route based on the status of the ACS system. The system can select a different route or payment modality to ensure ACS downtime does not impact the transaction processing.

Figure 19:
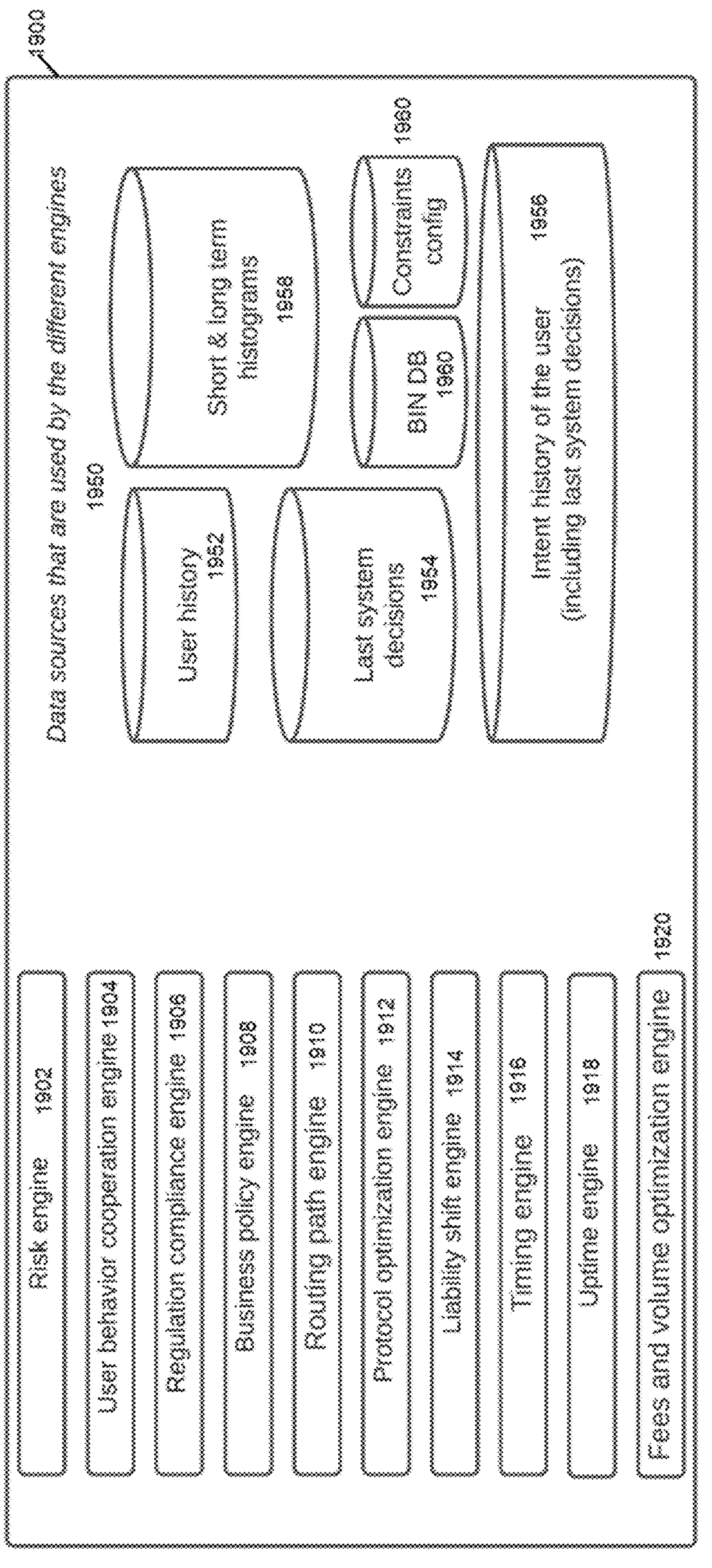
FIG. 19 is a block diagram of an intelligent routing system, according to one embodiment.

FIG. 19 is a block diagram of an intelligent routing system 1900. As shown in FIG. 19, the system can include a plurality of processing engines that each contribute to a selection of an optimal route through a multitude of processing entities and systems. The various engines include processing rules tailored to respective processing entities and/or machine learning models that evaluate transaction information, which can include prior context determined for other processing systems/nodes. The following example engines can be instantiated separately or can be implemented holistically, and the functionality described can be performed by the intelligent routing system without instantiating the respective engines.

As shown, the system can include a risk engine 1902 that provides a risk decision based on processing rules and or ML model(s). In some embodiments, the ML model is configured to evaluate transaction details, the behavior of the user in the web/mobile application (e.g., navigation patterns, where did the user arrived at the site, speed of movement, etc.), the connections of the user (e.g., location, vpn/proxy, etc.), linked transaction information, and users that previously bought on the same website, or were previously evaluated by the system. In some examples, the risk engine is configured to output a decision that includes an approved or denied status, risk level, and can include reasons associated with the evaluation. For embodiments employing the ML model, the model is trained on tagged transactions that indicate what is legitimate, what is fraudulent and reported as fraudulent. Once trained the model can produce as output for a given transaction a decision: approve/decline, risk level, and optionally output reasons. Various models can be trained to determine risk for a transaction and include, for example, information retrieval methods such as probabilistic relevance framework, Fellegi-Sunter model, Human In The Loop, supervised learning methods such as Gradient Boosting, Random Forest, Support-Vector Machines, Logistic Regression, Deep Learning, Clustering, Clustering on Graphs, Graph Machine Learning, Anomaly Detection, time series cross validation, feature engineering, labels missing at random/completely at random, among other options.

The system can also include a user behavior/cooperation engine 1904 that is configured to determine a probability of the user cooperating with an authentication process and/or with the decline recovery instructions. The engine 1904 can be based on processing rules, ML models, and/or hybrid model of rules and ML. In some embodiments, a behavior model can be trained on the history of the user's successful and unsuccessful transactions. For cases where the model is missing the specific user's data, the model can be trained on a similar pattern of behavior in a matching customer segment. An example segment can include similar users/people in matching (e.g., Nordic) countries, and cities of certain populations. For example, the model can recognize that Nordic purchasers of large cities tend to cooperate with security challenges more readily.

In further example, the model accepts as input device data, transactions data, historical user data, statistical behavioral data and generates an output that includes a probability score of cooperation per of each type of challenge. With the probability score output the system can evaluate candidate routes and select the option that achieves the highest likelihood of success given the prediction of where the user will comply or succeeds at security challenges.

The system can also include a regulation compliance engine 1906 that is configured to determine compliance with regulations that may apply (e.g., PSD2 in the EU, etc.). Various embodiments can include models of rules, statistical models, and hybrid combinations of the same. The engine 1906 is configured to calculate the different factors that improve likelihood of success while preserving a frictionless experience (no enhanced security requirements) as much as possible while staying compliance with applicable regulation. The engine 1906 can be configured to operate as a gatekeeper for the various regions to avoid breaches of compliance. In one embodiment, the model employed by the compliance engine 1906 can be trained on regulation rules per country/region, acquirer risk level, region, merchant country, card holder country, transaction data (amount, mcc), merchant current risk level, and transactions data, among other options. The model is configured to output a set of limitations on which routes are possible given a specific transaction to ensure regulation compliance.

The system can also include a business policy engine 1908 that is configured to evaluate business policies set for participants/systems. The engine 1908 enables the system to adjust or optimize routes based on complying with internal business decisions, anti-money laundry (AML), sanctions, operation risk, market limitations, insurance risks, cost optimization, distribution rights. Various embodiments implement the business policy rule engine with processing rules that accept merchant business policies, country policies, any other limitation that is required by a merchant, e.g., volume commitment, fees per transaction (for routing to the cheapest provider) as inputs. The engine is configured to generate as output a set of limitations on which routes are possible given a specific transaction.

The system can also include a routing path engine 1910 configured to determine a probability that payment ecosystem accepts the transaction on a specific route, which can be based on historical success rates. According to one example, the engine is configured to evaluate usages of authentication protocols such as 3DS. In further example, the engine is configured to evaluate routing options without authentication. In various embodiments, the routing path engine is a ML engine trained on transactions data with each of and/or combinations of cardholder/issuer/global historical success rates per route. Once trained, the model is configured to output for a given transaction input, a score per each possible route, and the system can use the score to select the route with the highest possible score. Further the score can be used in conjunction with the outputs of the other engines and/or the routes analyzed by the engine can be filtered based on outputs of the other engines. In one example, the model can be based on reinforcement learning methods such as multi armed bandit, among other options discussed above for the other ML models. Various other model architectures can also be used to determine a likelihood of success for a given route (e.g., information retrieval methods such as probabilistic relevance framework, Fellegi-Sunter model, Human In The Loop, supervised learning methods such as Gradient Boosting, Random Forest, Support-Vector Machines, Logistic Regression, Deep Learning, Clustering, Clustering on Graphs, Graph Machine Learning, Anomaly Detection, time series cross validation, feature engineering, labels missing at random/completely at random, among other options).

The system can also include a protocol optimization engine 1912 that determines an optimization of a route per any one or combination of issuer/acquirer/network scheme to deliver a preferred method+information fields from the transactions to include in the processing route, along with formatting of the information/transaction. The engine 1912 can operate based on defined processing rules, ML models, and combinations of the same. The engine 1912 is configured to calculate the probability of success in sending the transaction with a specific field/method in a specific route. Example ML models can be trained on transactions data plus protocol plus the method used to process that are tagged as successful attempts vs failures. Some examples can be trained to evaluate tagged restrictions within the same context. Upon input of transaction information, the trained models can be configured to output a best format for the transaction, a protocol type, and a security protocol version to use (where applicable). Example outputs of the models can include formatting for transaction information, lowercase/uppercase, state full name vs. state code, with/out middle name, 3DS version selection (e.g., not always latest), should exemption be requested, should exemption be requested via authorization or via enhanced security (e.g., 3DS) protocol.

The system can also include a fees and volume optimization engine 1914 configured to select a best route based on merchant volume commitment and/or fees. In various examples, the engine 1914 is configured to calculate statistically the volume commitment per the time in the month and fees per route to meet any defined commitment, while processing to achieve the lowest fees possible. The engine is based on evaluation of transactions data including fees per transaction, volume commitment with discounts per route, restrictions per route, and the engine is configured to output a score per possible route.

The system can include a liability shift engine 1916 configured to optimize the route of transactions in order to trigger a shift of liability to the issuer. The shift engine 1916 can also be configured to reduce the risk to enter into a fraud scheme program per acquirer/route. In some embodiments, the shift engine includes ML models trained on historical success rate of authorization after successful authentication, merchant current chargeback rates per route, fraud level per entity including fraud alerts when they exist. Upon input of transaction information the model outputs a score per possible route. The system can use the score to select an optimal routing. Various weights can be applied to each such selection or output to enable the system to reconcile the collective engine outputs or emphasize selection of weighted options.

The system can include an uptime engine 1918 that is configured to determine on a one-time transaction a probability that all the participating parties in a route are currently available to process the transaction in a timely manner. Some embodiments employ keep alive messages transmitted to determine current status for various processing nodes. In other embodiments, the system can analyze failures and/or increase in failure rates based on a recent time frame, and predict and/or determine that one or more nodes in a processing route are having availability issues. In other embodiments, predictions on uptime can be made by trained models. For example, the model can be trained on transaction data, routes real time availability data, historical analysis of any one or more or combination of acquirer/network/issuer availability. Based on an input of the same, the model can output set of limitations on which routes are possible.

The system can include a timing engine 1920 that is configured to choose the best timing to process a transaction for a subscription/recurring payments. The timing engine can be based on processing rule, ML models, and combinations of the same. In one example, the engine 1920 includes processing rules and ML modeling. In one example, the ML model can be trained on transaction data, cardholder historical data, route success rate per hour of the day/day of week/day in month, possible time windows, and any timing limitation. Various models can be trained according to various time periods and used based on matching period, collectively, etc. Upon input of transaction information, the model is configured to output a date and time to send (e.g., within the possible time windows constraints) the transaction to achieve the greatest likelihood of success.

Figure 20A:
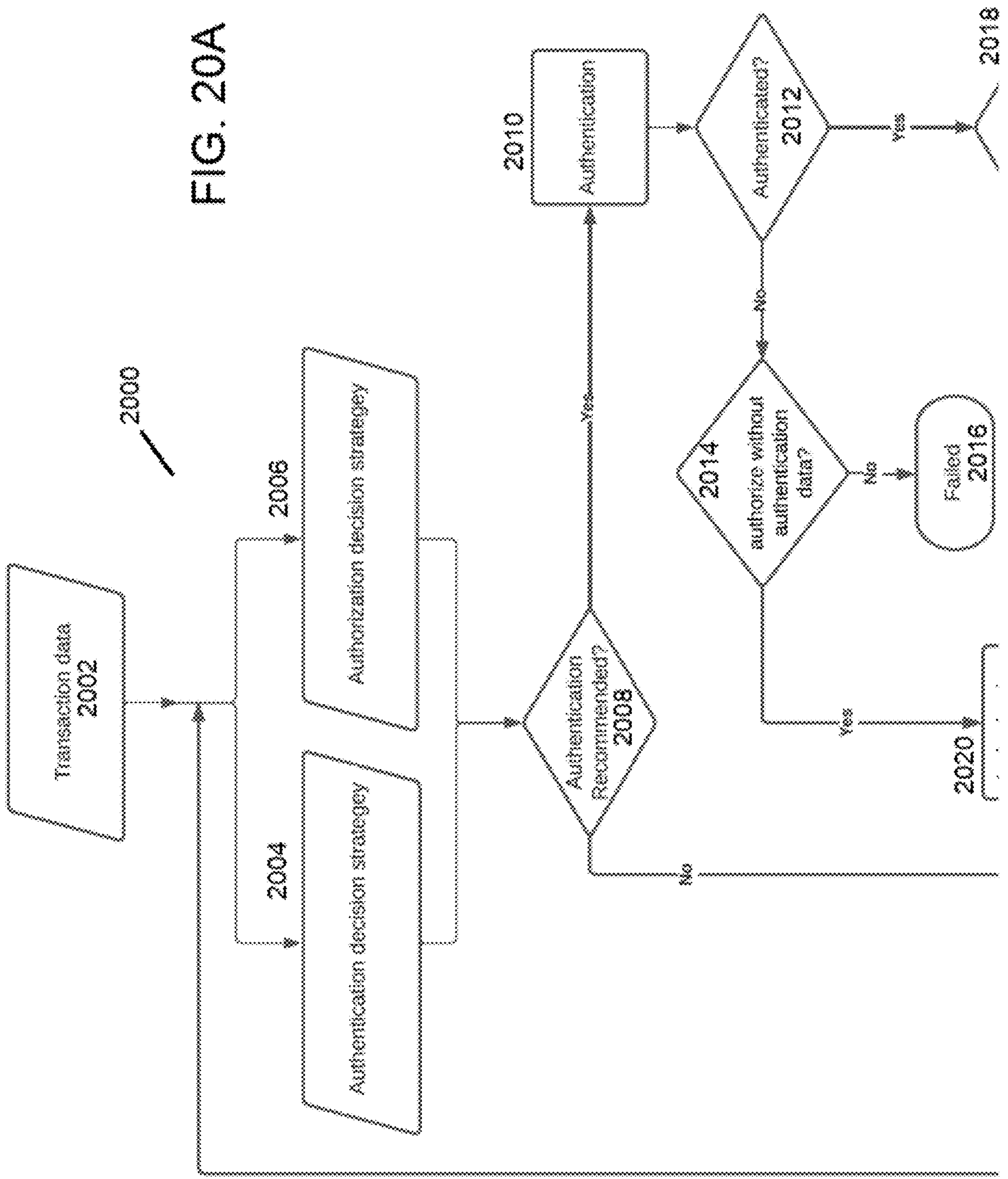
FIGS. 20A-B show an example optimization process flow, according to one embodiment.
Figure 20B:
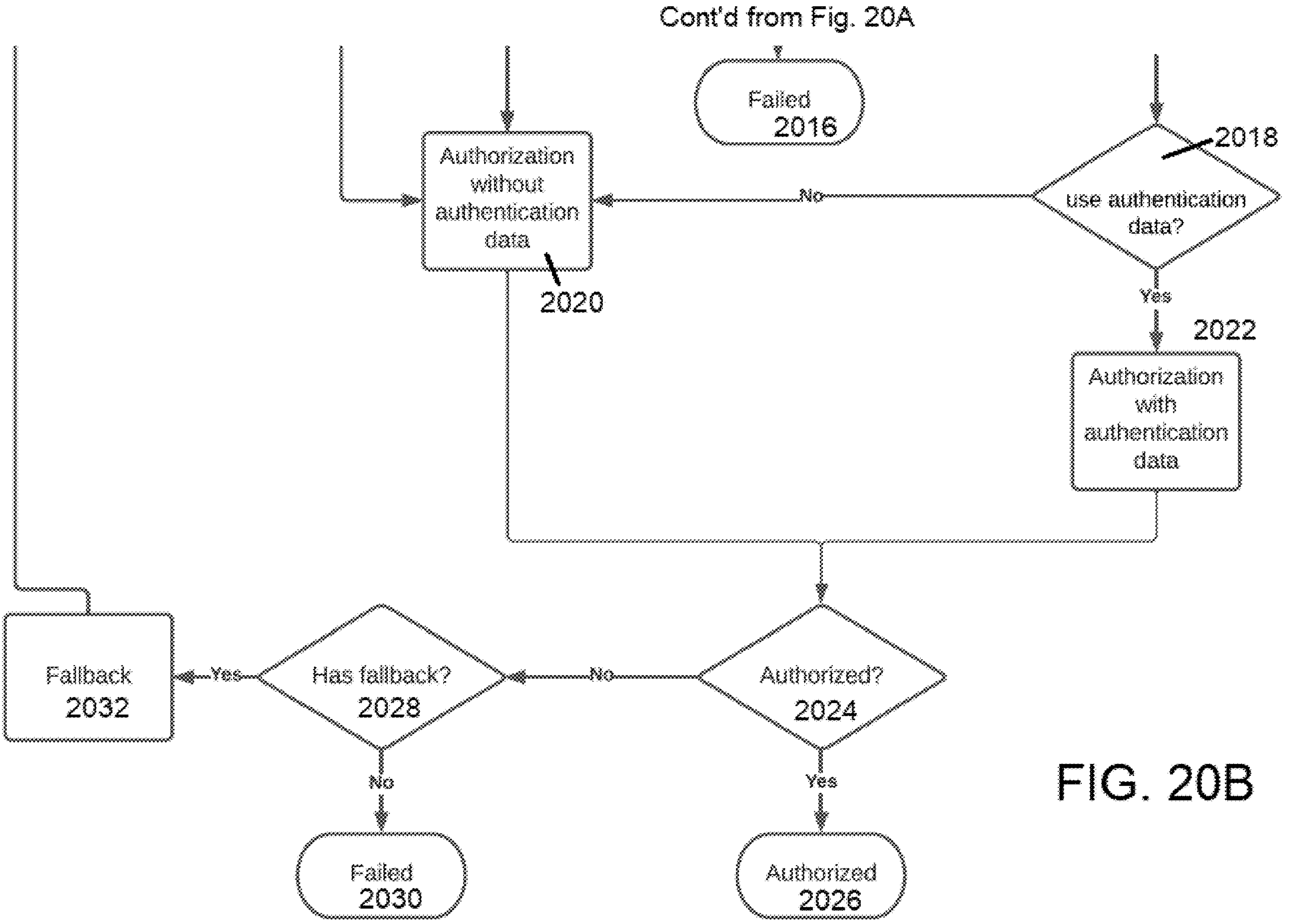

Shown in FIGS. 20A-B is an example process for processing a transaction to optimize the likelihood of success. The process begins at 2002 with capture of transaction data. In various examples, the transaction data is captured from a CNP transaction that is performed online. The process continues by forking to an authentication decision strategy at 2004 and authorization decision strategy at 2006. According to various embodiments, the authentication decision strategy can be determined by an intelligent routing system and/or processing engines instantiated by the intelligent routing system. For example, the authentication decision strategy can include analysis of a risk score produced by risk engine, user behavior analysis by a user behavior cooperation engine, among other options. For example, the authentication decision strategy can include evaluation of processing routes imposed or restricted by regulatory requirements. A regulation compliance engine can evaluate potential routes and limit options based on applicable regulations. The filtered set of options can be evaluated as part of the authentication decision strategy at 2004.

According to some embodiments, the various engines discussed with respect to FIG. 19 can be used to analyze the transaction data to provide an authentication decision strategy. The results of the authentication decision strategy can include whether or not to execute enhanced security measures (e.g., execute 3DS or not, select a security version, select other protocol optimization parameters, select information sets to be processed as part of transaction routing, etc.). In further embodiments, the various engines discussed above can also facilitate the authorization decision strategy at 2006. For example the authorization decision strategy can include a determination that an authorization request with a specific processor will achieve the greatest likelihood of success (e.g., with or without specific authentication). In another example, the authorization decision strategy can identify an acquirer that will result in the greatest likelihood of success for transaction. In still other examples, the authorization decision strategy at 2006 may include identification of specific information parameters that should be passed to a processor and/or an acquirer in order to achieve the highest likelihood of success. The steps at 2004 & 2006 are shown separately as a process fork, however, the decision strategy at 2004 and 2006 can be combined in other examples. As shown, process 2000 continues at 2008 with a recommendation as to whether authentication will improve the likelihood of success of the transaction. In some embodiments, the recommendation at 2008 is used to automatically trigger authentication protocols as part of the transaction. In other embodiments, the authentication recommendation at 2008 can be presented to a purchaser or to a merchant system to allow the transaction to proceed based on a recommendation or notification in the user interface.

Where authentication is recommended at 2008 YES, an authentication request can be made at 2010. In some examples, the purchaser may be presented with an SMS code that must be entered to complete a transaction. In other embodiments, authentication can include a challenge response protocol, username and password, biometric authentication, or other authentication information. If the user is authenticated at 2012 YES then the process continues at 2018. If the user fails to authenticate at 2012 NO, the process can include a decision as to whether it is advisable to proceed with the transaction without authentication data at 2014. For example, having failed to authenticate, the process can determine that the transaction is still likely to succeed based on an authorization request that is not accompanied by authentication data. For example, a routing path engine can determine that a transaction is still likely to succeed if presented without authentication information. However, if the evaluation at 2014 determines that it is not advisable to continue, the process 2000 will conclude at 2016 with a failed transaction.

According to one embodiment, where it is determined that a transaction is likely to succeed without authentication data the process can continue at 2020. Similarly the process can arrive at 2020 based on a determination that authentication is not recommended at 2008 NO. Further, even where a purchaser is authenticated a determination can be made as to whether it is advisable to use the authentication information at 2018. Even where the purchaser is authenticated, predictions may determine that a transaction is more likely to succeed without the authentication information versus with at 2018 NO. For example, a protocol optimization engine can accept the current transaction information as input, including specific routing contexts (e.g. processor, acquirer, issuer, etc.), and output a determination that the transaction is more likely to succeed without using the authentication data.

According to another embodiment where the purchaser is authenticated, the process can determine that the transaction is more likely to succeed by utilizing the authenticated data and pass that information along to participants/systems the processing route at 2018 YES. The process continues at 2022 with an attempt for authorization including the authentication data. The process continues from 2020 and 2022 to a determination of whether the transaction is authorized at 2024. If the transaction is authorized at 2024 YES, the process can conclude at 2026 with an authorized transaction. If the authorization request fails at 2024 NO, the process can still continue with fullback processing at 2028. If no fallback option is available 2028 know the process concludes at 2030 with a transaction failure. Additional processing may be executed upon a failed transaction, which includes, for example, updating training of machine learning models used in the routing determination, updating histogram analysis of transaction and execution data, among other options.

Were a fallback option is available 2028 YES, process 2000 can continue at 2032 with evaluation of a candidate routing involved in the fallback operation. According to various embodiments, each fallback option that may be available, undergoes the same decisioning strategies (e.g. authentication and/or authorization decision strategies) and is analyzed to determine what options will achieve the greatest likelihood of success for the transaction. Process 2000 is shown an example process. In other embodiments, various steps or analysis can be combined, executed in parallel, or omitted.

Returning to FIG. 19, a variety of data sources can be used by the different engines. For example, at 1950 are shown a plurality of data sources that can be used to train various models or derived various rules for processing the transaction and determining an optimal route. For example, a user history database 1952 can store user history information for specific users. In another example, the user history database 1952 can store transaction information and associate that transaction information with user personas. User personas can be used instead of specific customers or users for similarity analysis and/or behavioral analysis associated with the user attempting a current transaction.

In various embodiments, the system can also record prior analysis on optimal routing and/or decisions and use the results of those decisions to update various models, derive, and/or adjust processing rules, among other options. In one example, the system can store prior system decisions in its own data store database at 1954.

As discussed herein, various embodiments of the intelligent routing system can be configured to employ statistical models of systems, participants, and users to provide short and long-term analysis. For example the system can include a database for generating and storing long and short-term histogram at 1958. The histograms can be configured to analyze operational trends in transactional data, and may do so based on each participant in a process route.

Transaction information can also be organized based on logical groupings to facilitate modeling. According to one embodiment, the system can store transaction information based on bank identification numbers (BIN). Bank identification numbers are associated with issuer banks and can be used to organize transaction data that various levels. For example, a logical information hierarchy of transaction data can include a BIN level, a county level, a country level, among other logical groupings. According to some embodiments, the logical groupings can be organized so that the system can analyze specific data (e.g. BIN) and abstract out to a next level of detail if the specific data level is too sparse. In one example, the system maintains a BIN database at 1960.

In further embodiments, the system can also include a database to specify constraints on optimization decisions and or processing routes. For example, the system may maintain the constraints database at 1960. The constraints can include jurisdictional rules, participant-based rules, value-based rules, among other options.

In other embodiments, the system may also maintain a database of intent history for various users at 1956. As discussed herein, intent history allows the system to connect various failed transaction attempts with successful operations and learn what adjustments or changes enabled success. In some embodiments, the intent history can include linkages to a last system decision and the results of the selected approach.

Figure 8:
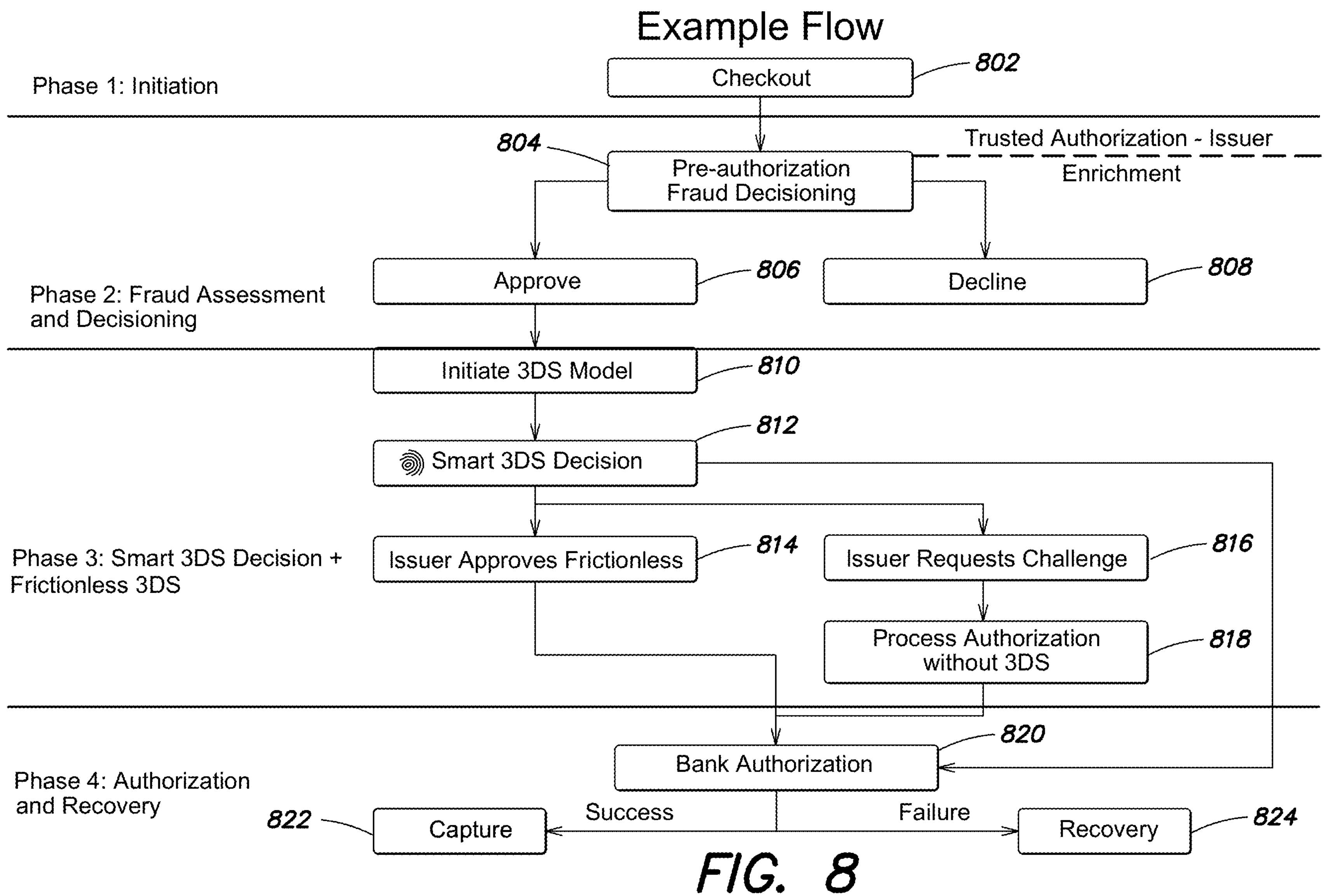
FIG. 8 is an example process flow for optimal routing, according to one embodiment.

Shown in FIG. 8 is an example process flow for optimizing routing of operations. According to one embodiment, the process shown in FIG. 8 can be used as part of routing a card not present transaction ("CNP"). CNP refers to transactions that are typically conducted online or where a card is not present when initiating a transaction. In such circumstances, various enhanced security measures can be invoked in order to ensure the transaction is not fraudulent or involves the cardholder as the initiating party.

For example, the process can begin at 802 with check out on a website, among other examples. In some embodiments, the initiation of the transaction represents the first phase of an optimal routing. According to some embodiments, the optimal routing process can include multiple phases. For example, a second phase can include pre-authorization fraud decisioning as part of a determination of an optimal route at 804. In some examples, fraud decisioning at 804 can include machine learning and/or rule-based analysis of any available information on a transaction (e.g., initiating entity, payment modality, location, timing, product, value, IP, location, merchant, browser, frequency of transaction, among many other options). In various instances, the process can conclude at 808 with a decline of the transaction based on identified fraud characteristics or properties. In some examples, machine learning models are trained on transaction data with at least the previous contexts to recognize fraudulent transactions. If there is no indicia of fraudulent activity or a threshold is passed indicating a valid transaction, the process can continue at 806 with approval of the transaction.

In some embodiments, the process can enter another phase (e.g., phase 3) at 810. As part of 810, an enhanced security model is used to evaluate optimal routing of the transaction. In one example, the enhanced security model is trained on a multitude of transactional data to recognize when enhanced security can be used via a frictionless pathway.

In various embodiments, 3DS represents an enhanced security processing protocol. 3DS reflects agreements among various providers and industry participants of specific requirements for validating or enhancing security of card not present transactions. The process shown in FIG. 8 illustrates a 3DS model, however, the model is not limited to the known 3DS implementation, but rather illustrates an example model trained to evaluate any enhanced security approach.

In some examples, the enhanced security model is trained on transactional data where enhanced security is triggered or not based on the details associated with particular transactions. The model can classify a current transaction to determine if enhanced security will be triggered, and whether challenge response protocols will be required or can be avoided (e.g., frictionless processing). In some embodiments, historic data can be used to develop processing rules that can supplement or substitute for the machine learning model and provide information on what security features are expected/required for a given transaction. Shown in FIGS. 15 and 16 (discussed in greater detail below) are various processing routes that can be evaluated upon a checkout procedure (e.g., at 802). As shown, various options for routing of transaction are available and evaluated from an initial fraud decision to a payment method, whether friction is required or not, which processing system is used, and whether decline solutions are required and/or can be optimized to handle any failed transaction.

According to some embodiments, at 812 a smart routing decision is made based on predicted enhanced security requirements. For example, where a given route would result in an issuer requesting the transaction with additional friction (e.g., 816) the optimal route can be identified to occur without enhanced security features (e.g., 818), where the optimal route does not use or invoke any additional security. In various embodiments, the machine learning model can predict whether a transaction will require enhanced security for a plurality of routes, the model can also predict when enhanced security will trigger friction (e.g., challenge response protocols), and the model can also predict when the enhanced security with friction will results in a failed transaction, among other options. In the example shown at 818, the system has identified that a challenge response protocol will result in a failed transaction and thus selects an optimal routing that avoids enhanced security entirely. In various embodiments, different models can be used to predict at the various decision points, providing greater accuracy in the respective predictions and consequently, greater efficiency and confidence in an optimized route selection.

In other examples, an optimal routing decision at 812, can predict that a given issuer will approve frictionless processing at 814. Identifying and selecting such a route enables the system to select an option that qualifies for enhanced security treatment, but without the processing required for challenge response protocols.

According to various embodiments, the process continues at 820 (e.g., phase 4) with a determination of bank authorization. The system can predict and select a route through the various systems and/or intermediaries to achieve the highest likelihood that authorization will be successful at 820. According to some embodiments, by modeling the execution along a plurality of routes the system is able to determine the most efficient processing route. In some examples, the system can select enhanced security where the additional processing requirements does not affect the success or failure of the operation (e.g., 820 success to 822 capture), or where the enhanced security makes recovery more efficient (e.g., at 824). According to one example, the system can determine that none of a plurality of routing options will yield a successful operation (e.g., 820 failure). In such circumstances, the system can evaluate recovery options at 824.

In one embodiment, the system can be configured to optimize the recovery approach at 824. For example, predicting that none of the routing options will yield success, the system can select for subsequent processing options that will yield a successful operation.

Figure 7:
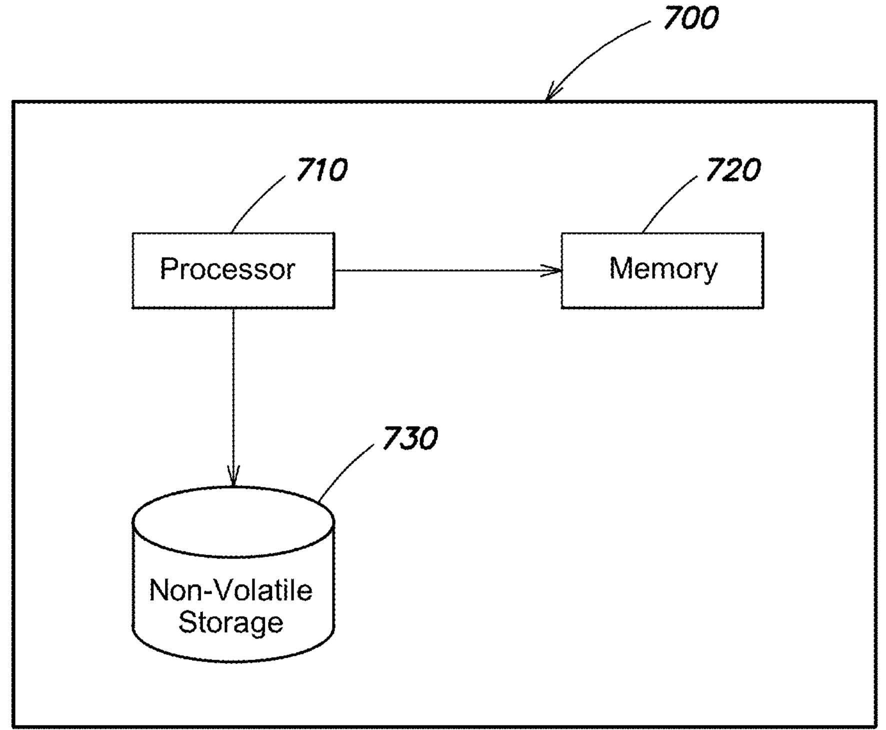
FIG. 7 is a block diagram of an example special purpose computer system improved by the functions and/or processes disclosed herein.

Additionally, an illustrative implementation of a special purpose computer system 700 that may be used in connection and improved with implementation of any of the embodiments of the disclosure provided herein is shown in FIG. 7. The computer system 700 may include one or more processors 710 and one or more articles of manufacture that comprise non-transitory computer-readable storage media (e.g., memory 720 and one or more non-volatile storage media 730). The processor 710 may control writing data to and reading data from the memory 720 and the non-volatile storage device 730 in any suitable manner. To perform any of the functionality described herein (e.g., transaction evaluation, probability analysis, re-routing transaction pathways, re-submitting transactions, etc.), the processor 710 may execute one or more processor-executable instructions stored in one or more non-transitory computer-readable storage media (e.g., the memory 720), which may serve as non-transitory computer-readable storage media storing processor-executable instructions for execution by the processor 710.

Various embodiments can also be configured to determine optimize routing based on which intermediate systems/providers are required, where those intermediate system or end point systems are located, any application of jurisdiction requirements that are triggered by the associated locations, among other options.

According to some embodiments, the jurisdiction(s) through which the routing passes can impact the efficiency analysis of the respective routes. According to one embodiment, the known PSD2 regulation may apply to transactions communications throughout the European union, and other subscribing nations. In some examples, the system is configured to make real time decisions for each transaction/route to determine between multiple routing options and associated systems, what pathway and what security approaches (if needed or potentially avoided) results in the most efficient communication pathway. As discussed, the most efficient pathway can be determined based on reduction of failed executions (e.g., target communication and execution success to avoid subsequent communication and/or processing of retries, among other options). Stated broadly, the optimization of communication can occur to avoid any one or more of the following: a user failing or abandoning enhanced security/identification procedures that can be triggered among potential or candidate routes, an acquirer declining the authorization (e.g., requiring retry or re-submission for valid transactions), an issuer declining the authorization (e.g., requiring retry or re-submission for valid transactions), among other options. The system can evaluate each communication path and internal routing decision based on one or more of the following.

(A) Evaluate enhanced security layers (e.g., 3DS)—in some examples, the system can select a route based on a need to apply 3DS or a potential to avoid enhanced security requests, where further analysis can evaluate a selected routing taking into consideration a likelihood of a specific user to cooperate with the enhanced security (e.g., using past history, the device, the country, the industry, the amount of the purchase and the regulatory constraints that may apply via each potential route). In further example, the system can evaluate which enhanced security protocol can be required with each or across multiple possible routes (including, for example, a version of 3DS (3DS1, 3DS2.1, 3DS2.2, 3DS2.3)). System analysis can include evaluation of whether to apply 3DS at all or in a reduced burden mode—for example, the system can determine where there is an opportunity for "frictionless" authentication or if there is a challenge protocol that would be required to comply with 3DS standards. Frictionless authentication allows processing to occur according to various security standard but without invoking a challenge response protocol as part of processing.

(B) Introduce exemption request into processing/pathway—In some embodiments, the system, can determine if an exemption to enhanced security would apply to a specific transaction execution and any one or more of the possible communication pathways to perform the transaction. In addition, the system can analyze end point behavior to predict (e.g., machine learning model, historical analysis, etc.) whether the end point will grant the exemption request. In various embodiments, various communication paths represent a more efficient route based on the ability to avoid enhanced security protocols based on a sufficient prediction or evaluation that the end point will accept an exemption request. The system can be configured to identify an optimal route and automatically request an exemption (e.g., via the 3DS rails, or via the authorization request, among other options).

(C) Evaluate delegated authentication—In various embodiments, the system can evaluate possible communication routes, intermediaries, and/or end points by considering routes with options for delegated authentication. In typical processing/communication, an issuer of a payment modality (e.g., credit card, gift card, user account, coin based service, digital wallet provider, etc.) performs the ultimate authentication for a request. In various embodiments, the system is configured to evaluate pathways that employ authentication delegates, who have the authority to confirm authenticity or evaluate decoupled authentication where third parties can act on behalf of the issuer. In some examples, new communication routes are evaluated based on third parties acting as end points to authorize (or not) requests. As discussed, routing decisions can be based on optimizing a route based on invoking or not enhanced security, the ability to qualify as enhanced without additional security layers (e.g., via frictionless, exemption, etc.) and improve the efficiency single communication pathway, improve security, etc.

(D) Evaluate Jurisdiction Impacts on Routing/Efficiency—In some embodiments, the system can be configured to evaluate optimal routing based on jurisdiction (e.g., European security regulation, US security regulation, etc.). For example, the system can use jurisdictional security requirement to determine optimal routing (e.g., optimize based on greatest level of security provided, optimize based on minimizing regulatory burden, optimize based on reducing likelihood of further processing or retry, optimize on improving retry success rate, etc.). The system can be configured to evaluate an originating jurisdiction, end point jurisdiction, and intermediary system jurisdiction(s) in determining an optimal route for any communication/execution.

According to some embodiments, the system can optimize routing to ensure completion of the transaction with the selected communication pathway. For example, the system can be configured to evaluate optional parameters and to emphasize enhanced security features while not increasing the likelihood of requiring re-execution or retransmission. According to one example, the system is configured to balance security with limiting re-execution to improve system efficiency. Various embodiments leverage enhanced security protocols (e.g., 3DS requests) without "frictionless" or exemption based approaches, when predictive modeling indicates that execution of the operation will not be affected (e.g., not likely to trigger a failure in the execution). While there are some existing approaches that leverage enhanced security protocols, these existing approaches are typically concerned with only one dimension of analysis—avoid "friction" in execution, but these approaches fail to balance the ability to improve security and authentication services, especially where modeling indicates enhanced security will not impact execution. Further embodiments balance multiple dimensions in evaluating and identifying an optimal route. The dimensions evaluated include: an assessment of the risk of the transaction (and how it may impact participants in the communication/execution pathway), the participant tailored factors controlling execution (e.g., security requirements, risk threshold, responsibility for execution (e.g., downstream shifting (as needed or as defined by participant preference), and the likelihood the various dimensions trigger failure by the processing system and/or the initiator (e.g., additional friction that may lead to abandonment of an operation), and from the end point systems which may be in a conflicting stance to the intermediary systems (e.g., reluctance to accept responsibility for execution (e.g., reluctance to authorize a "risky" transaction, or reluctance to permit approaches that avoid enhanced security, etc.)

In the US, 70% of transaction executions that qualify as "enhanced security" are "frictionless 3DS," meaning challenge response protocols are not triggered. The result of these selections is a significantly increased rejection rate at the end point of the communication path (e.g., the issuer declines the authorization), and the requirement to re-execute valid operations. In this setting, the communication path can be significantly improved and the wasted processing for re-execution can be avoided by leveraging a prediction that increased security will be completed by the initiating party and will result in an authorization. It is noteworthy that processing regulations provide an advantage in enhanced security (e.g., 3DS) so that the liability for a transaction chargeback is shifted to the issuer banks when they authorize a transaction. Thus, independent of computational efficiency, participants in the communication/processing pathway for a transaction (e.g., merchants) have an incentive to maximize the liability shift. This incentive can operate contrary to system efficiency if liability shift is emphasized over operational/computational consideration. For example, liability shifting can result in failed authorization and require re-execution, retransmission, of the various transactions. Various embodiments of the system balance the computational burdens of enhanced security against the improved efficiency gained from improving the likelihood of success which limits re-executing of valid operations.

Further embodiments avoid declined authorizations, and the resulting re-communication and additional processing, for example, by leveraging predictions on when 3DS will result in declined authorization (e.g., initiator failing to complete challenge, initiator failing to response properly to challenge, etc.). In various embodiments, the system can tune the balance between enhancing security and suffering execution failure. For example, the system is configured to define a percentage threshold on predicted authorization rate decrease in order to maximize the implementation of enhanced security protocols. In some examples, the system emphasizes security over re-execution reduction. In one example, the system can be configured with tunable settings that permit reductions in execution in ranges from no decrease in completion rate to permit decrease in completion rated up to a percentage (e.g., 0.5, 1, 1.5, 2, etc.), which results in more executions of enhanced security (e.g., 3DS—as noted, improved security can also serve independent goals of shift liability downstream).

In various embodiments, the system is configured to permit any one or more or any combination of the following optimizations, and implementation any one or more or any combination of the following analyses:

- For all type of 3DS, the system can be configured to define a threshold % of overall decrease to successful execution (e.g., conversion (or none)), in order to implement execution in improved security protocols for an analyzed execution/communication path (e.g., successful execution of 3DS protocols of any version, among other options);
- The system can be configured to evaluate across multiple participant systems (e.g., merchants, intermediaries, services, etc.) in the same industry but also in different industries in order to make sure that the optimization of the communication path/system selection includes modeling within and without various industries. In some embodiments, the system can implement outlier models and/or classification models to identify operations having higher risk and/or operations having low risk and characteristics of valid transactions. In further example, the system can identify greater efficiency in triggering enhanced security in higher risk setting, rather than in lower risk settings yielding different execution path even for similar operations.
- The system can be configured to generate and evaluate statistical histograms with different time periods—for example 30m, 1 h, 3 h, 10 h, 24 h, 48 h, 1 w, 2 w, 1 m to establish that there is enough data to determine that an external ecosystem is changing in real time, and if a change is needed to be applied to the decision without waiting for full (for example, 48 h histogram) histograms to be filled or for updated models trained on recent data to account for the change. Under some embodiments, the system is able to check and leverage short history compared to long history using the various histograms. The system can also give each analysis (e.g., histogram) varying weights in determining operational changed are occurring that need to be factored into optimal routing. For example, the system can be configured to perform analysis different segments of intermediary systems (e.g., such as per payment service provider ("PSP"), merchant, processing domain, acquirer bank, MID, MCC, group of industries, schema, currency, BIN, issuer bank, amount range, etc.). For example, the system when implementing this approach is configured to balance between short term and long term histograms of the analyzed data and assign weightings to each. The weighting can be adjusted as longer period histograms confirm the analysis of shorter period and vice versa.

The system can be configured to generate histograms within a hierarchy that allows, for example, the system to check analyzed information for BIN level. Here the system is configured to determine if there is not enough statistical information to use Bank issuer information (contains multiple BINs) or if there is not enough statistical information to use country level information to develop current models or histogram based analysis. In some embodiments, the system is configured to develop histogram analysis at a granular level, determine if the data can be used within a degree of confidence, and if not, abstract out to a next level in the hierarchy (e.g., larger grouping of data). Various embodiments can be viewed as using segmentation with hierarchy in order to cover for cases that have a specific time period where there is not enough information to use with confidence.

The system can be configured to generate/analyze history information across different vertical/horizontal prisms and multiple data layers/combinations in order to dynamically inform the decisions. Examples include:

- i. customer in site history with the specific payment method
- ii. customer across sites with a specific payment method (issuer)
- iii. customer in site with different payments
- iv. customer across site with different payments
- v. merchant success with specific issuer
- vi. merchant success across issuers
- vii. merchant success across processors
- viii. processor-issuer success across all merchants and more
- ix. and many more combination of transaction properties, for example, country specific information sets, which can be used or modelled by the system based on jurisdictional parameters, among other options.

According to some embodiments, the system is configured to develop operation models based on "Intent"—a unique linking protocol that can connect between attempts of purchasing by the same individual across multiple devices, across different accounts, across different payment methods, and across different network connections. In some examples, the system is configured to build an intent based model where the system detects that the individual was not able to complete a purchase (e.g., of a good, service, etc.). According to one embodiment, the system is configured to determine that the transaction is part of the same intent of the consumer to make the same purchase. For example, the system can build a model of a transactions and train a classifier to link an intent to a transactions. In some instances, the system uses data points such as amount, ISP, WIFI, IP, class c of IP, cart line items, device fingerprinting, account identifications, email, name, card number, product designation, service designation, time of the purchase and any re-attempt to purchase, etc., and the model fits those properties into an identification of a user intent.

The system can analyze and/or model payment modalities using intent connections to identify what did not work for unsuccessful executions and what did work for the successful one. Further, each payment gateway, processor, acquirer, network (e.g., verification services) can be analyzed to determine what contexts cause failure and what changes permitted success. The system can build processing rules based on success and failure criteria for each participant/system in a route, as well as machine learning models that can output a likelihood of success based on input transactions properties.

According to some embodiments, the system assigns the different transactions or the same attempts in the same transaction identify, a unique intent ID that is later used by the system for reports and understanding the success per intent. By determining successful operations based on intent, the system is able to optimize subsequent routing, processing, and communication based on the entire path (including re-execution) and not just the success per transaction that conventional systems are limited to. The system is able to optimize across and report on the overall customer journey and experience (e.g., succeed immediately vs attempted multiple time until success, or multiple time failure, among other options). The inventors have realized that the intent query can be different between industries, sites, or platforms, and by analyzing routing and/or processing to include intent, the system can optimize for executional efficiency in each of those segments. For example, the system calculates the likelihood of the attempt to purchase to be related to a previous attempt that failed, and determines if a current transaction matches the same intent to purchase or a new one (e.g., if the user is trying again to but what he did not manage to buy previously (e.g., even yesterday) or if the transaction is a new purchase).

According to various embodiments, the system is configured to identify a matched intent, which triggers elimination of the prior routing to avoid repeating the same decision (an execution failure). For example, if a transaction content is presented, the system identifies a matched intent, similar circumstances to a failed execution, and re-routes or dynamically selects a new processing pathway. In one example, the system triggers 3DS challenge/response enhanced security, where the failure was based on not meeting security requirements, in another, the system avoids 3DS challenge/response protocols, as the initiator abandoned such validation, in still others, the system can request the initiator select a new payment vehicle to avoid issues/pitfalls presented in prior execution or predicted issues/pitfalls.

In another example, the system identifies a matching user intent (see below), when the system receives a decline indicated from the bank. The operation was routed with a 3DS2 security protocol. Historic information/modeling shows that this bank prefers 3DS security protocol (99.9%). As long as the transaction meets other requirements from risk perspective, the system can determine that the optimal path routes the transaction without 3DS, instead of the prior 3DS2 protocol. If the operation is successful under the predicted route (e.g., with 3DS compared to using 3DS2), the data is used by the system as a unique feedback loop (e.g., with a greater weight over population based models or rules for execution). In some examples, the system can employ confirmed routes in order to quickly teach the system that, for example, the issuer might have changed their known behavior. Deviations from expected predictions can likewise trigger feedback and weighting to enable the system to dynamically and quickly shift optimization decisions on transaction routing.

Further embodiments use Naive Bayesian chains to increase or decrease an estimation of the probability of success of each course of action for routing a transaction. In various embodiments, system is configured to integrate these piecewise estimation elements into an optimization decision, rather than override the analysis.

According to one embodiment, the system can build any number of inferences based on the factors discussed above (e.g., enhanced security improves execution and avoids re-try, enhanced security with exception can be used (e.g., improves execution and avoids retry while reducing enhanced security protocols), etc.), FIG. 19 illustrates various factors that can be analyzed by the system, and includes example, engines that are configured to analyze various elements of transactions, which can be based on processing rules, machine learning models, etc. By analyzing a multitude of potential execution paths, the system is able to optimize the selected path based on overall system efficiency, and may also include options to take into account intermediary system policy (e.g., merchant policies), operational volume agreements, chargeback penalty programs when deciding how to route the transaction, among other options.

As part of developing optimal routing models, the system can be configured to be tolerant of a lack of particular pieces of information. For example, the system can be configured to implement exploratory decisioning. In one example, the system selects routes in order to gather data and make more accurate decisions later (for example if the system doesn't have enough data on a specific BIN as to how it behaves with 3DS). In various embodiments, the system can be configured to weighted exploratory data collection against the loss of optimality of routing decisions.

In some settings, the system is able to leverage analysis performed in the routing context to enhanced operations of the participants in the processing environment overall. For example, the system can provide additional data points/parameters to the end point of the transaction pathway (e.g., issuer) into the authorization/authentication that improves execution rates (e.g., can potentially help issuer or any PSP to approve transactions and avoid re-execution processing). In further examples, the system based understanding of any required additional information, may be used to trigger a request to the consumer to add this information. For example, the system can identify that for a specific issuer all the historical transactions passed only when CVV existed and was presented. If for a given transaction the CVV is missing completely, the system can notify or prompt the consumer (or an intermediary) to provide the CVV. Notably, the system also performs and optimization analysis factoring the risk of not submitting the CVV.

According to some embodiments, the system is configured to provide recommendations whether an exemption should be processed through the 3DS framework (authentication) or through the authorization process according to level of authorization success. The system can present such recommendations in a specific combination of order data, issuer, acquirer, ACS (vendor whom in charge whether to approve exemption in the 3DS rails or not), currency (value range), amounts (value range), type of product, etc., where the exemptions are processed through the 3DS Rails, not through the rails, etc.

In further embodiments, the system is configured to execute experiments in an automatic way, or in half automatic method, for example, in order to build prediction models or rules, for example, on how regulation (for example PSD2) is behaving in a specific country before any implementation deadline. For example, the system can consider if transaction authentication is predicted to require friction (e.g., enhanced security protocols) from the consumer or not, the system can balance between keeping authorization high, and enhanced security, and may also factor in effects on moving liability to the issuer, etc. In further example, the system is configured to consider not only if a bypass to a challenge/response security check would be offered to consumer, but if the consumer would actually complete the challenge/response if presented, and can also consider the likelihood that the transaction will be completed (e.g., passed also in authorization) in addition to the authentication protocols. In still other examples, the system is configured to connect risk level, friction indicator+authentication lift (not only predict friction but predict the accumulated impact of likelihood of friction to both the risk assessment and the likelihood to complete authorization), among other options. The system can use known data to build predictions on efficiency for any given processing pathway, where efficiency parameters can be based on heightened security, reduced re-execution, re-execution efficiency, etc.

Figure 9:
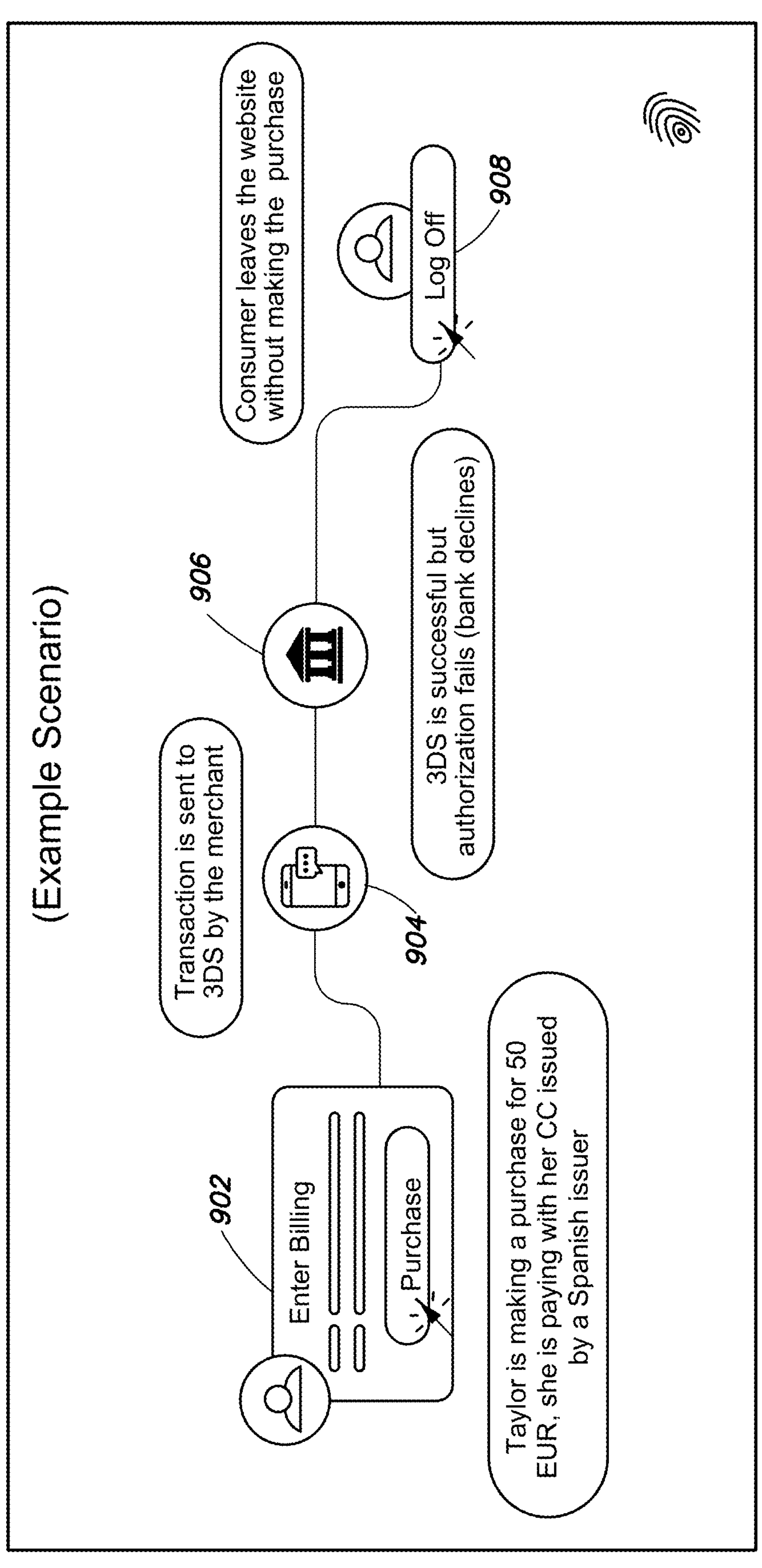
FIG. 9 is an example processing scenario, according to one embodiment.

Shown in FIG. 9 is an example scenario under which optimal routing can improve processing efficiency. For example, the operational flow begins at 902 with an initiator entering billing information. In this example, a purchaser is attempting to make a purchase for €50. The purchaser is paying with a credit card issued by Banco Sabadell. Under conventional processing, the transaction is sent through an 3DS protocol by the merchant at 904. At 906, the 3DS processing is successful, but authorization fails (e.g., issuing bank declines transaction). In this scenario, the consumer leaves the website without making the purchase in spite of supplying valid transaction and authentication information (e.g., at 908). Here, enhanced security features result in a failed transaction. In addition, the purchaser is likely to request the same transaction again. The initial failure and the redundant processing represents unacceptable waste of processing, capacity, and time.

Figure 10:
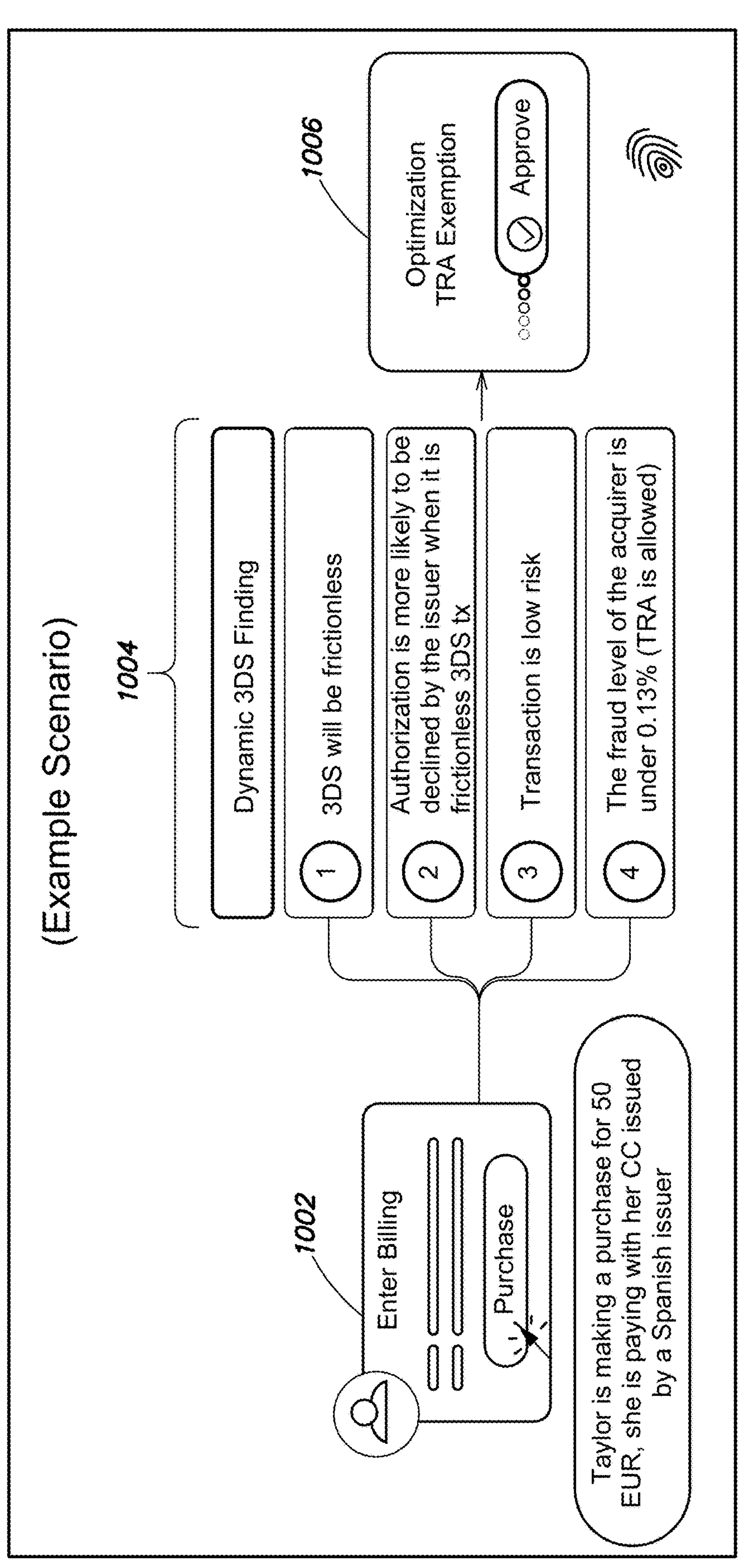
FIG. 10 is an example processing scenario, according to one embodiment.

Shown in FIG. 10 is another example scenario under similar circumstance. At 1002, a purchaser presents a transaction for €50, paying with her credit card issued by a Spanish issuer. In this example, the system is configured to analyze options for processing the transaction using the payment modality selected and according to whatever payment details have been provided (e.g., at 1004). According to one embodiment at 1004, the system can predict that an enhanced security protocol would occur without friction (e.g., no additional security processing required) for the given route. Further, the model determines that the Spanish issuer would likely not approve the transaction if it were executed under frictionless processing. The model would also determine that based on an analysis of the transaction, the transaction is a low risk (e.g., less than 0.1% probability of fraud) and evaluate that level of risk against a fraud level of the processor or acquirer. According to one embodiment, the system can determine that the transaction could proceed if a transaction risk analysis exemption was requested as part of the processing route. Thus, rather than allow the transaction to fail based on the issuer not approving a frictionless transaction, the system requests an exemption (e.g., 1006) as part of the optimized route and the transaction is completed.

Figure 11:
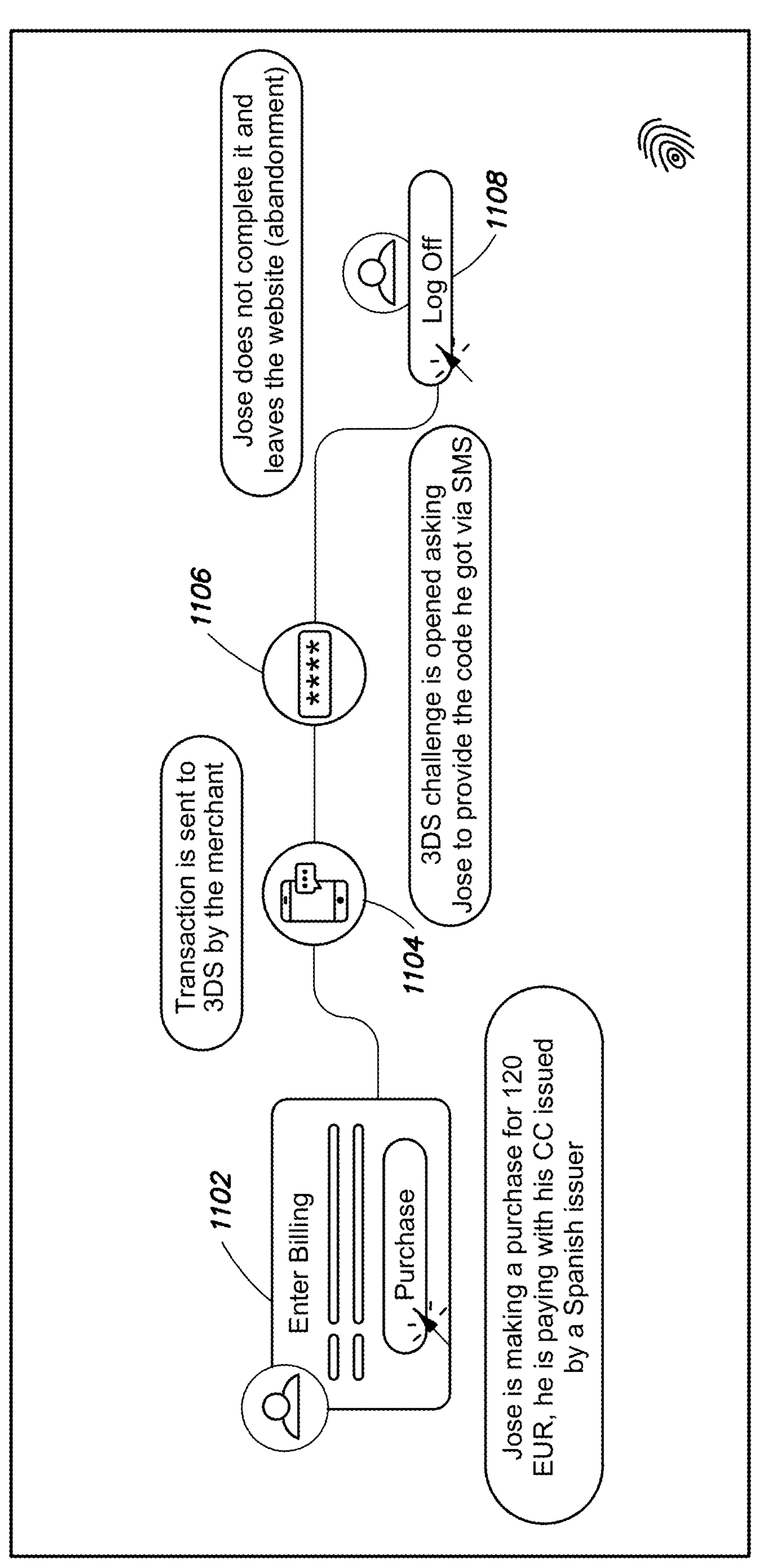
FIG. 11 is an example processing scenario, according to one embodiment.

FIG. 11 illustrates another example scenario. In this example, the purchaser attempts a transaction for €120 paying with a credit card issued by Spanish issuer Caixa at 1102. At 1104, the transaction is sent for enhanced security protocol by the merchant. At 1106, a challenge response protocol is triggered asking the purchaser to provide a code received via SMS. At 1108, the purchaser fails to provide the correct code, and leaves the website. The result is a failed but otherwise valid transaction.

Figure 12:
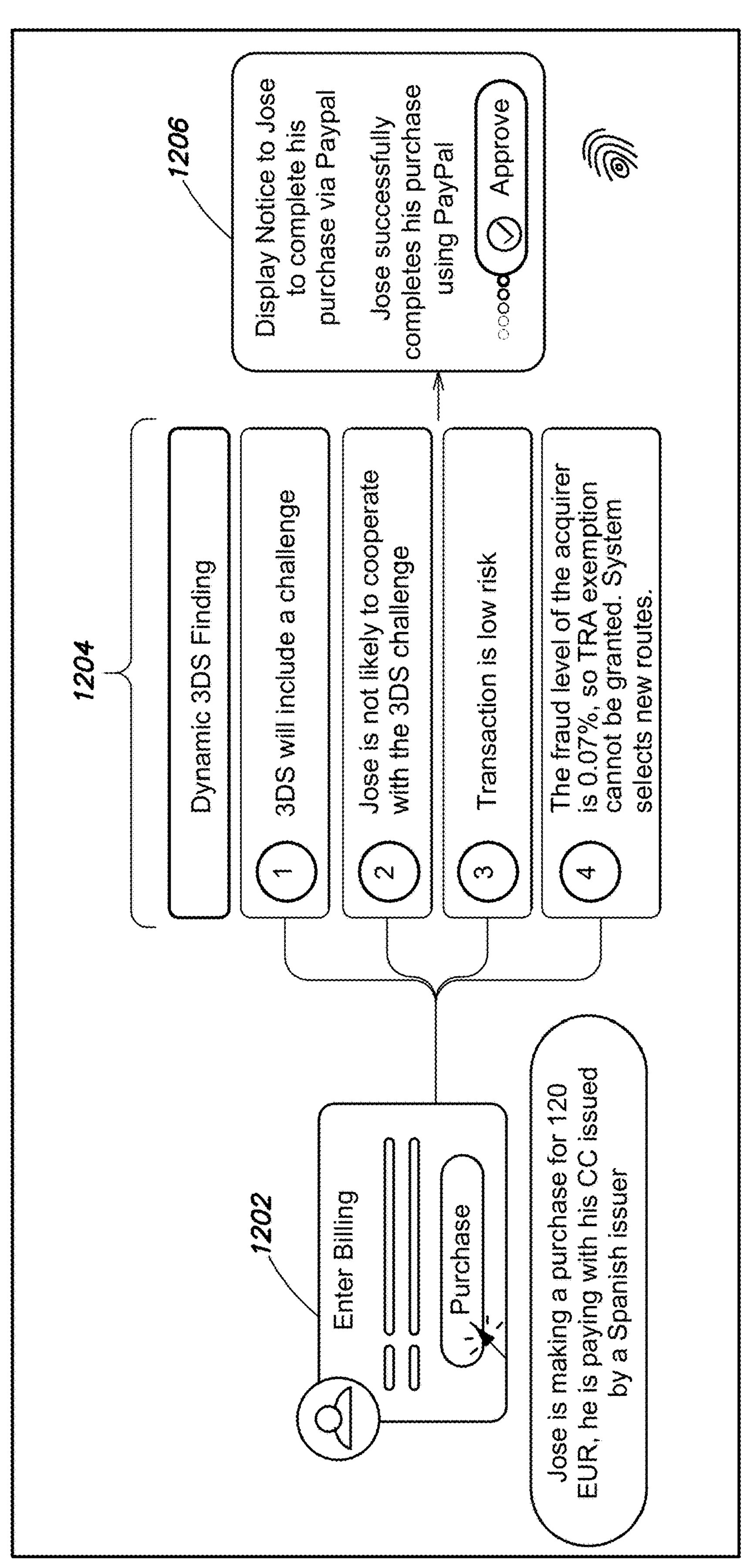
FIG. 12 is an example processing scenario, according to one embodiment.

FIG. 12 illustrates a similar scenario with optimal routing. At 1202, transaction information is entered by the purchaser. The purchaser is attempting a transaction for €120 paying with a credit card issued by the Spanish issuer Caixa. In response to submission of the transaction information, the system analyzes and predicts how the transaction will be handled at 1204. As shown at 1204, if enhanced security is requested it will include a challenge response request. Further, the purchaser is not likely to cooperate or succeed with the enhanced security challenge. Based on analysis of the transaction, the system can determine that the transaction is low risk and evaluate that risk against a defined fraud level of the transaction acquirer. In this example, the fraud level of the acquirer is 0.07% which is less than the analyzed risk level of the transaction. In this scenario, the system determines that the payment modality being used does not result in a processing pathway that can be successful. In this example, the system can evaluate other payment modalities available to the purchaser and determine whether those payment modalities would be successful. According to one embodiment, the system can evaluate any payment modality associated with the purchaser (e.g., PayPal). Upon determining which modality provides the greatest likelihood of success, the system can interrupt the payment processing under the initial selection and notify the purchaser of the optimal payment modality to use. In some examples, the system may notify the user that their current selection will likely fail and provide a list of payment modalities likely to succeed for the user to select from. In other examples, the system can identify the most likely option and provide a recommendation or notification to the user of the same (e.g., 1206).

Figure 13:
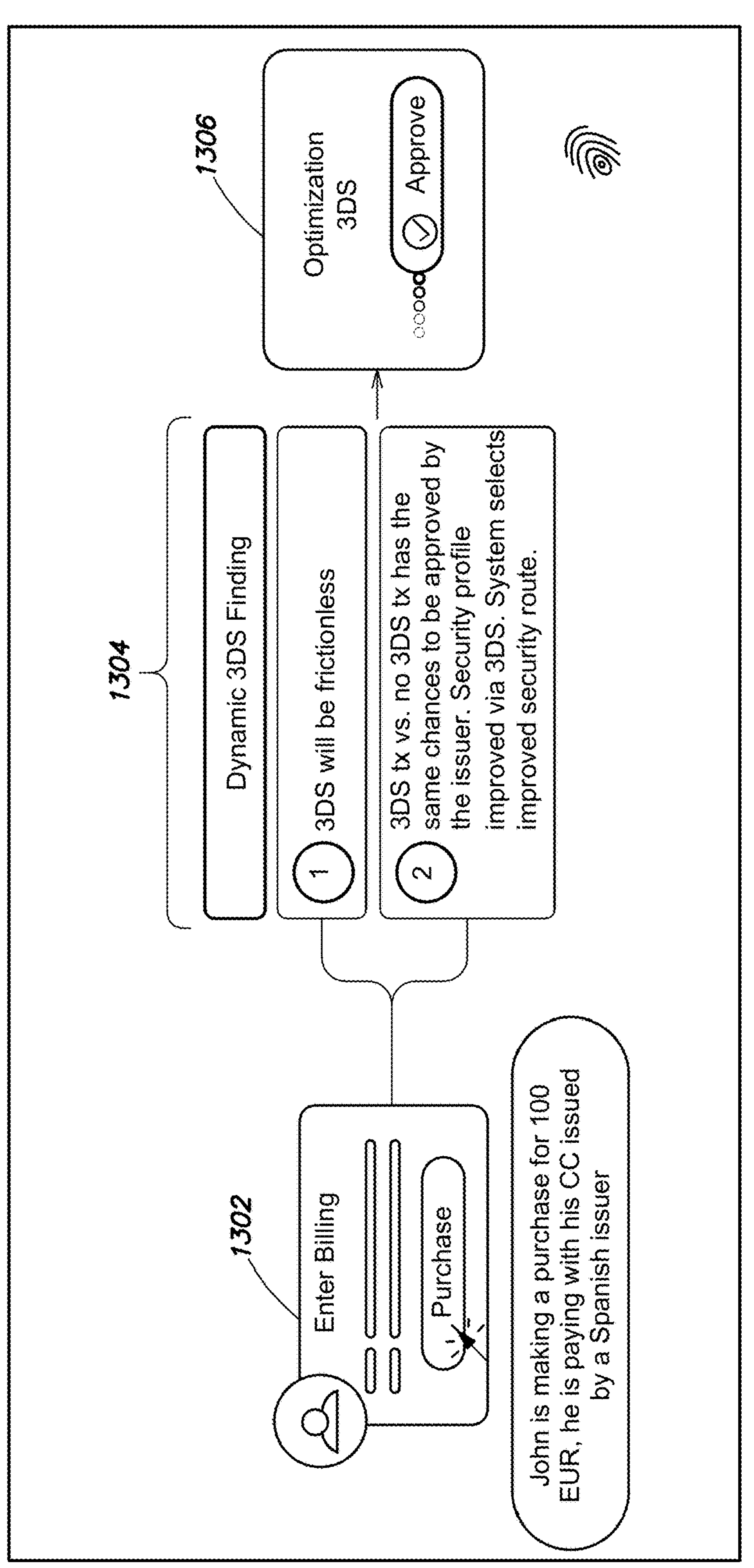
FIG. 13 is an example processing scenario, according to one embodiment.

FIG. 13 illustrates another example scenario with optimal routing. At 1302, transaction information is entered by the purchaser. The purchaser is attempting a purchase of €100 paying with a credit card issued by Spanish issuer Caixia. At 1304 the system is configured to analyze the outcome of the transaction based on the transaction information entered. For example, the system can predict that an enhanced security approach (e.g., 3DS) will be frictionless. The system can also model the outcome of the transaction based on using enhanced security or avoiding enhanced security. For the issuer Caixia, the system determines that either approach yields the same likelihood of success. In various embodiments, the system is configured to employ enhanced security measures unless the likelihood of success is reduced. In this example, the system will select the route with the enhanced security protocol (e.g., 3DS—e.g., 1306) as the optimal route for the transaction.

Figure 14:
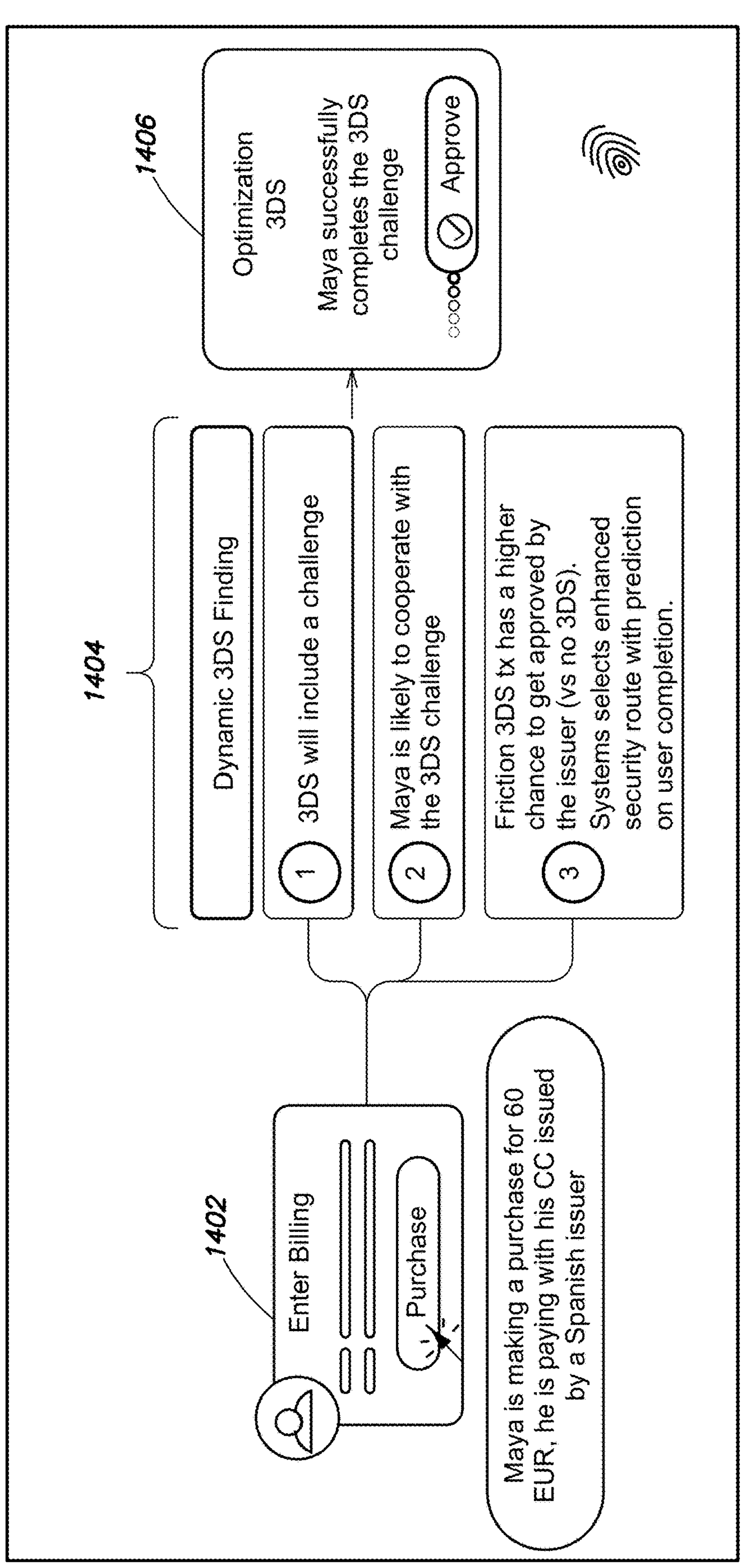
FIG. 14 is an example processing scenario, according to one embodiment.

FIG. 14 illustrates another example of an optimal routing. At 1402 billing information is entered and analyzed at 1404. In this example, the purchaser is attempting a transaction for €60 paying with a credit card issued by a Spanish issuer Caixia. At 1404, the system determines that processing will include enhanced security with a challenge response request. Further the system determines that the purchaser is likely to complete the challenge response request. As part of the analysis, the system also determines that the increased security of the challenge response improves the likelihood of a successful operation (e.g., versus no enhanced security). In this scenario, the system will route the transaction to invoke the challenge response protocol and ultimately yield the successful transaction at 1406.

Figure 15A:
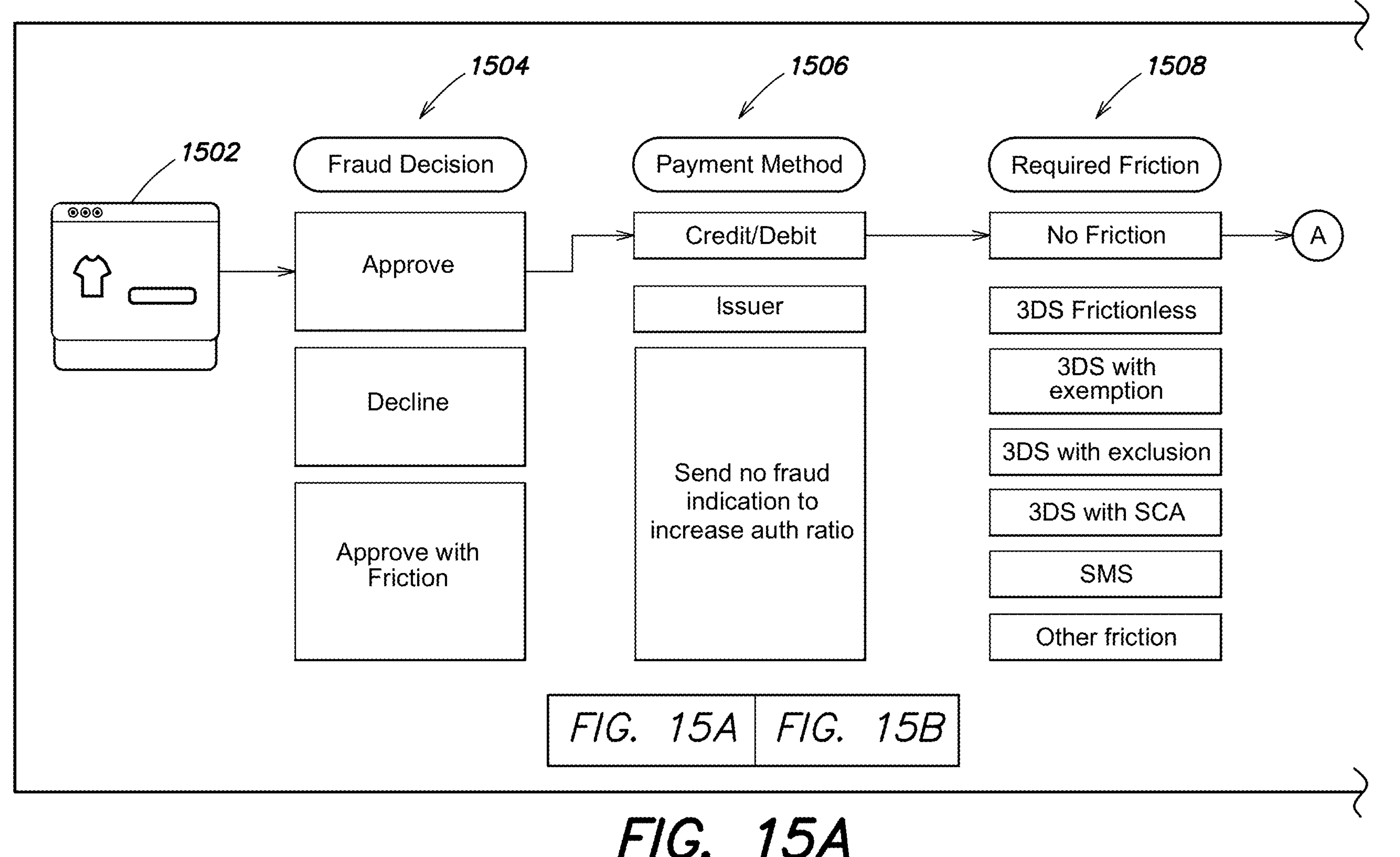
FIGS. 15A-B show a block diagram of an example process flow and participating systems, according to one embodiment.
Figure 15B:
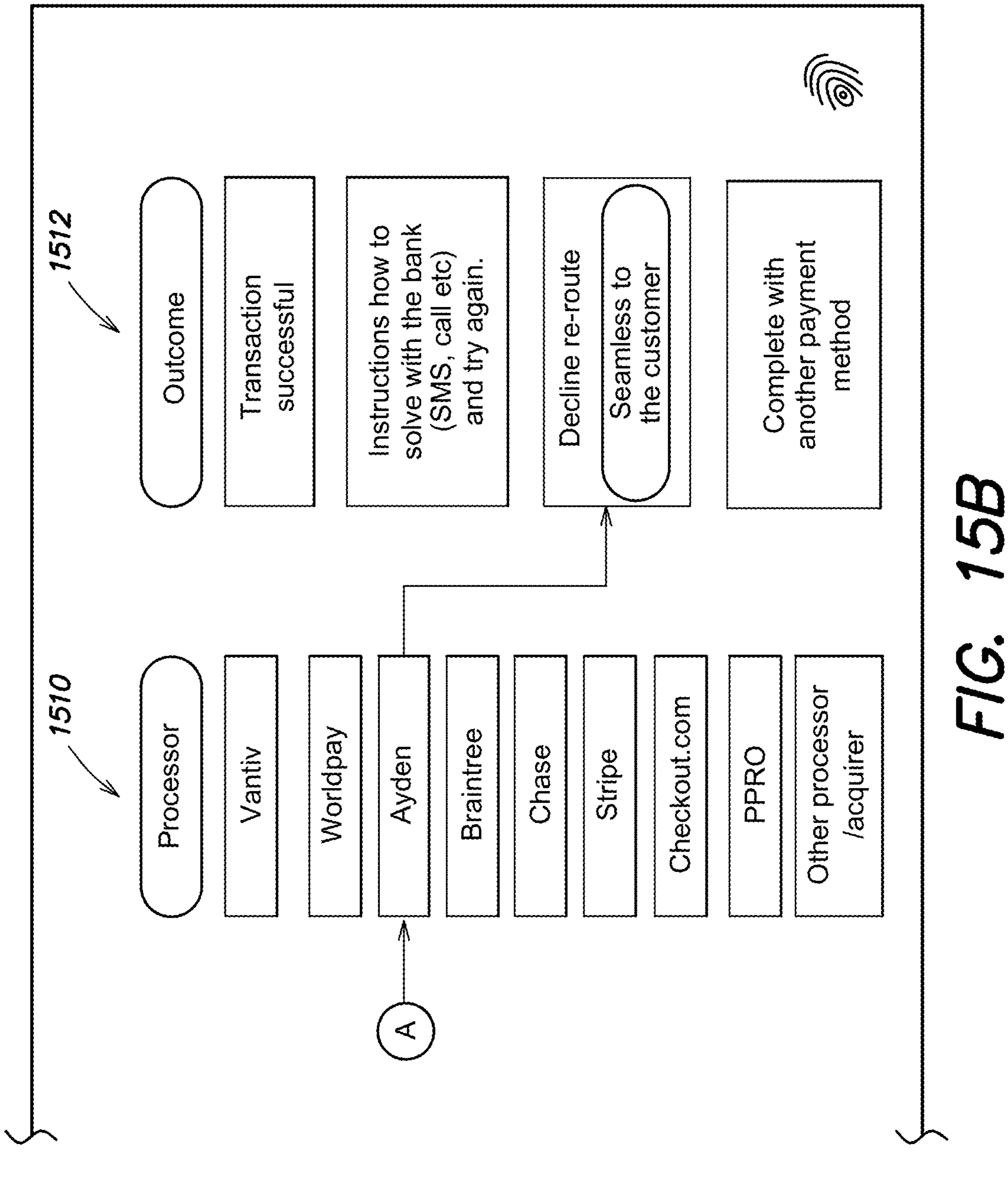

FIGS. 15A-B shows a block diagram of a process flow and the various systems that can be invoked/analyzed as part of optimal routing. As shown in FIGS. 15A-B, at 1502 a user transaction is requested (e.g., a CNP transaction). Shown in FIGS. 15A-B are a plurality of states (e.g., 1504), payment modalities (e.g., 1506), security options (e.g., 1508), systems (e.g., 1510), and potential outcomes (e.g., 1512). According to some embodiments, the system utilizes decisioning and analysis at each step to select an optimal route to complete the operation. In various embodiments, the system leverages machine learning models of prior transactions to determine what state, security, intermediary systems, and outcome will occur for each and/or any of the potential routes from 1502 to 1512.

According to one embodiment, the system implements machine learning model(s) to make a fraud determination for the transaction. In some examples, the system can then use the fraud determination to filter risky or potentially fraudulent transaction from further processing. In other examples, the system can determine that a transaction having characteristics of a likely fraudulent transaction could use enhanced security verification to resolve such fraud indicators and route accordingly.

As shown at 1504, the system can approve a transaction to move forward based on determining it is not (e.g., not likely) a fraudulent transaction. The system can also determine a transaction is likely fraudulent and decline immediately at 1504. As discussed above, the system can also determine that enhanced security or additional verification can resolve a potentially fraudulent transaction. Highlighted in FIGS. 15A-B is a transaction that passes the initial fraudulent determination, and at 1506 a payment method can be analyzed as part of optimal routing. In various examples, the determination on whether a transaction is fraudulent or not can be passed downstream in the processing route. The evaluation can facilitate further optimizations based on, for example, an evaluated riskiness of the transaction, among other options.

Various fraud evaluations can be used in 1504 including machine learning models and/or processing rules. In some examples, machine learning models are trained on historic transaction information to detect outliers from valid transactions and identify those outliers as potentially fraudulent. In one example, support vector machines can be used for outlier detection in this context. In other examples, machine learning models can be trained on transaction information to classify between valid and fraudulent transactions. For example, neural networks can be trained on transactions to recognize characteristics of valid transactions versus characteristics of fraudulent transactions. In still other embodiments, some machine learning models can be trained on transaction information to identify characteristics of an entity performing or requesting a transaction. These characteristics can be used to classify valid or fraudulent transactions, among other options.

Figure 16A:
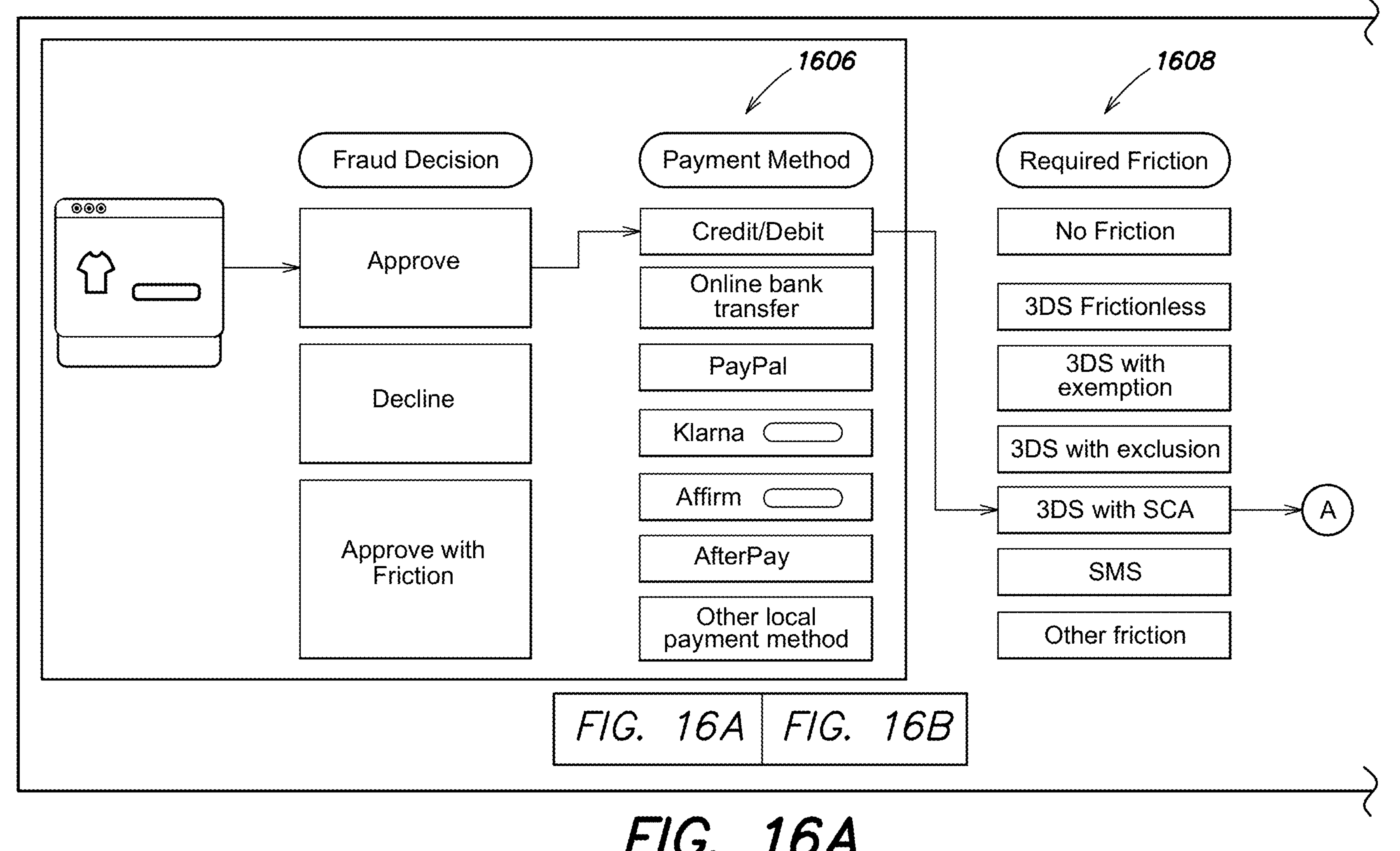
FIGS. 16A-B show a block diagram of an example process flow and participating systems, according to one embodiment.
Figure 16B:
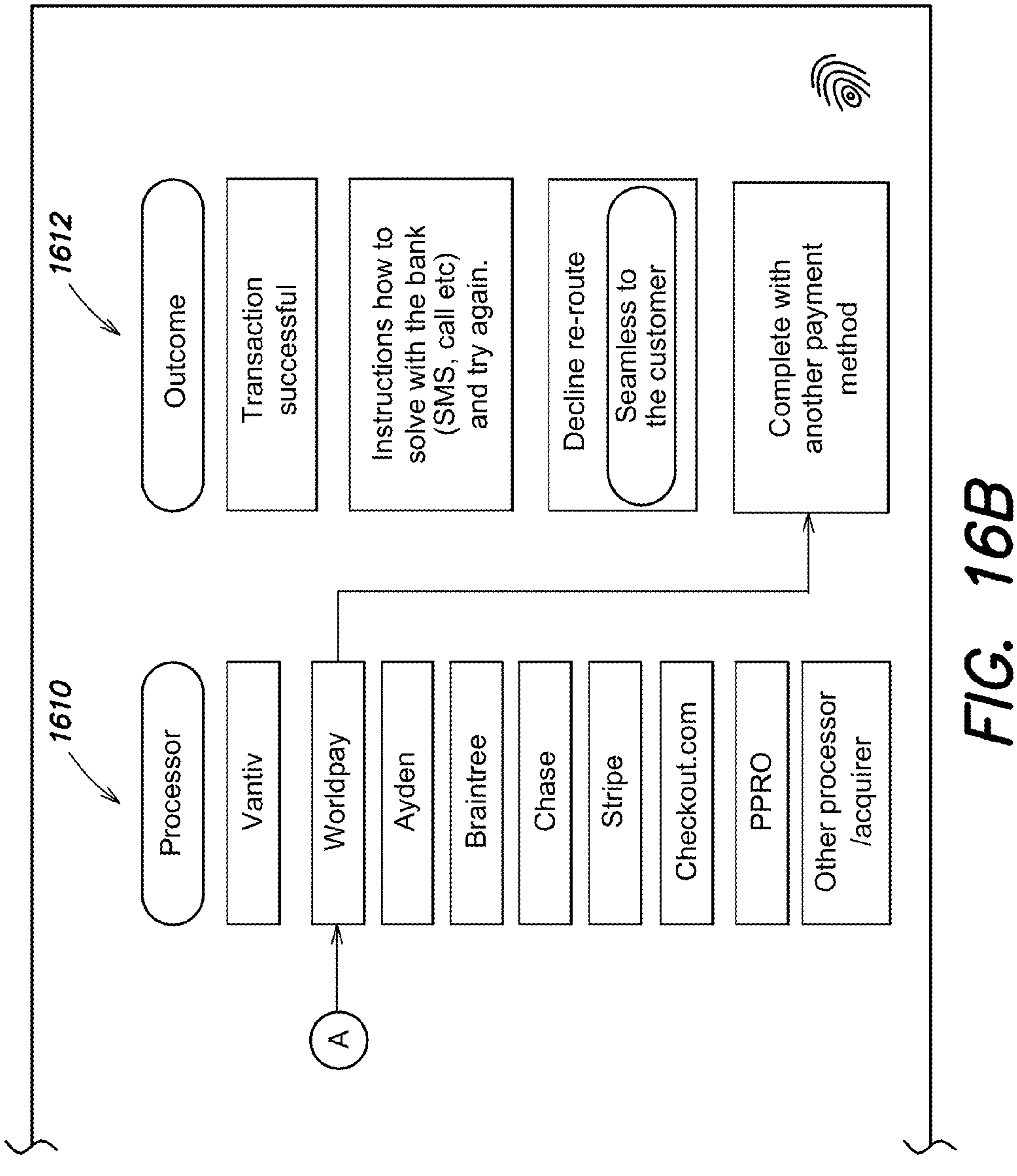

As discussed, the fraud determination can be passed downstream along a processing route. At 1506, the payment method is generically referenced as a credit/debit selection. FIGS. 16A-B illustrate a variety of different payment methods (e.g., 1606) that can be selected (e.g., credit/debit, online bank transfer, PayPal, chlorine, a firm, after pay, other local payment method, ALIPAY, WeChatPay, coin based services, etc.). In FIGS. 16A-B, the system evaluates another routing based on different security measures (e.g., 1608), different processor (e.g., 1610—WorldPay), and a predicted result for the routing at 1612.

Returning to FIGS. 15A-B, a route that does not require friction as part of a security process (e.g., 1508), is evaluated. The no friction selection can be evaluated for each processor shown at 1510. The example shows the selection of Adyen and the predicted result of processing without friction at 1512.

Figure 17A:
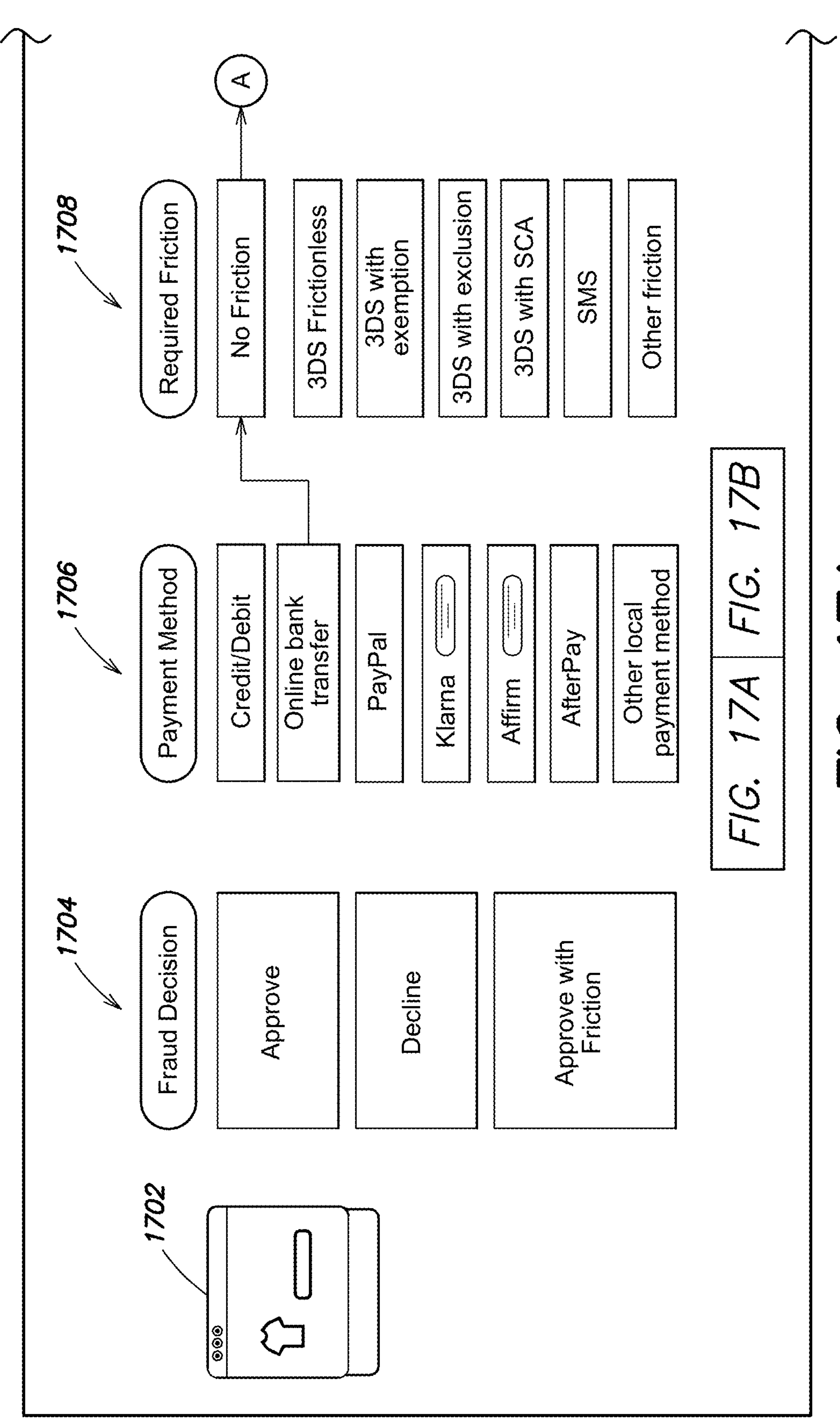
FIGS. 17A-B show a block diagram of an example process flow and participating systems, according to one embodiment.
Figure 17B:
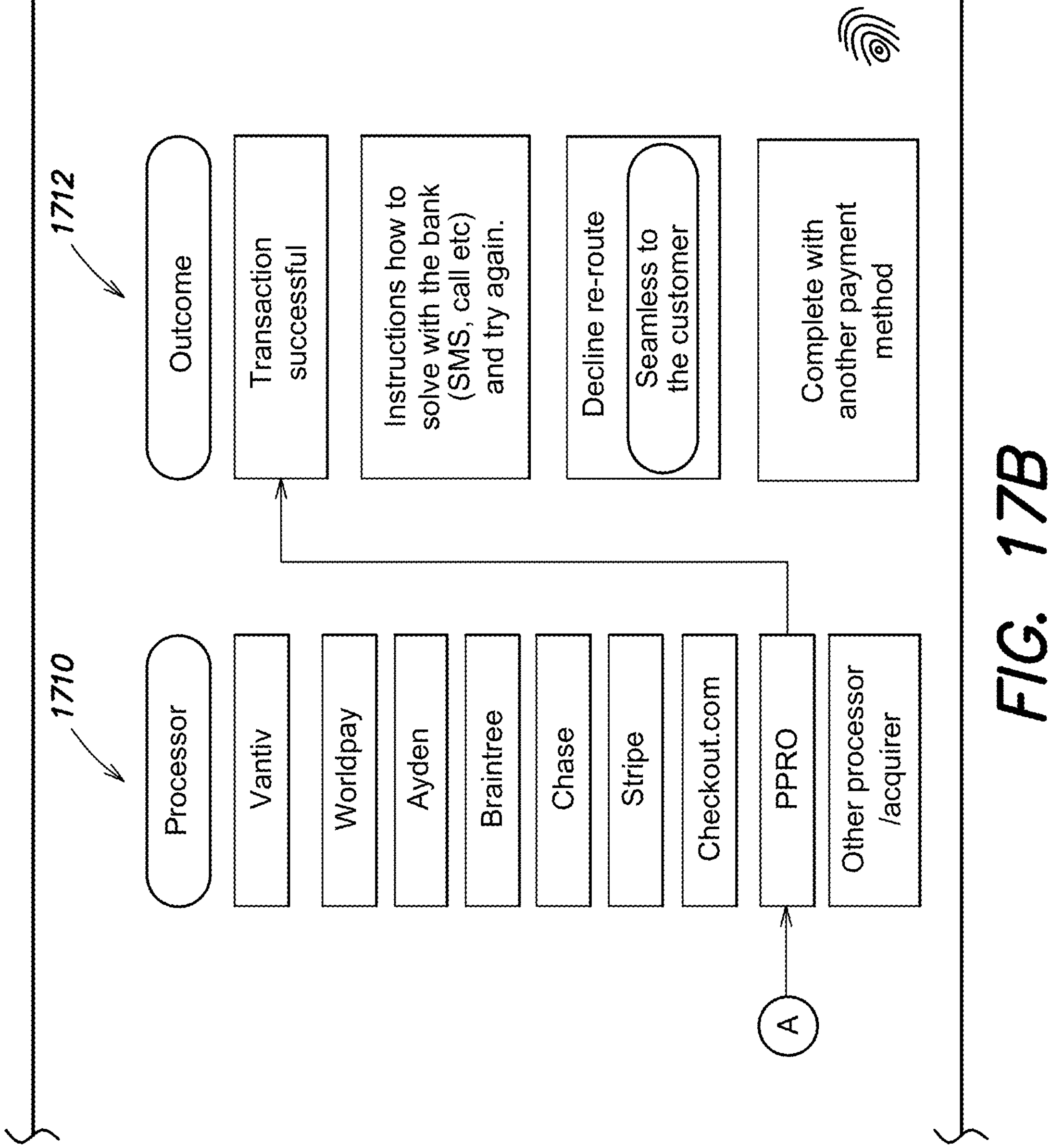

According to one embodiment, the system can determine a variety of routings from 1502 through 1512 and select the option that ensures a successful operation, reduces processing, provides enhanced security, among other options. FIGS. 17A-B illustrate a potential successful routing of a transaction (e.g., 1702) with fraud decision options (e.g., 1704) through a different payment method (e.g., 1706), security measures (e.g., 1708), processor (e.g., 1710), and result (e.g., 1712).

As discussed above, machine learning models, processing rules, and/or other analysis can be used as part of optimal route determinations. In addition to modeling fraud or valid transactions, various models can be trained on what security measures can or will be invoked by various selected routes. The models can be trained to determine for a given payment method and/or issuer what security implementation is expected. The models can be trained so that the prediction on security implementation can also be based on the specific context of a transaction (e.g., valid or fraudulent, low risk, high risk, low value, high value, origination, timing, history, user characteristic, etc.). In various examples, any data collected on a given transaction can be used as part of modeling what security is expected to be invoked and what effect that security will have on the execution of the operation.

In still other embodiments, the security invoked by a given route can be controlled by the system and selected to ensure successful operation. In some examples, the system can employ machine learning models trained on historic transaction data to determine the effect of a security process on the outcome of the operation. In further example, the model can be trained to account for a specific issuer, payment modality, among other options, as part of a prediction on the outcome of the operation. According to one embodiment, the likelihood given purchaser will complete enhanced security protocols can play a role in successful operation.

Various embodiments implement machine learning models trained on purchaser characteristics to output a determination on whether a purchaser will complete enhanced security protocols. The system can then balance the effect of enhanced security on successful operation against the likelihood of the user failing to complete the protocol in selecting an optimal route.

In further embodiments, the system can invoke machine learning models trained on historic transactions and/or to account for specific processors in a given route. Various embodiments can enhance, supplement, or substitute processing rules based on historic transaction data that specify what security features should be implemented to improve the likelihood of a successful operation for a variety of security measures and/or processors. The system can use the machine learning models and or the processing rules to determine an optimal route for successful execution.

In some examples, the variety of analyzed routes may still result in a failed operation (e.g., a prediction of a failed operation). According to one embodiment, the system can evaluate additional changes to the underlying transaction that may avoid the predicted issues. For example, the system may identify that a lesser payment amount will alleviate security concerns and allow a transaction to be executed effectively based on defined security parameters for any one of the given processors and/or by implementing specific security measures with a different transaction context (e.g., low value).

According to some embodiments, the system can be configured to identify changes in processing behavior of the various systems involved in any routing (e.g., FIGS. 15A-B, 1506-1512). According to one embodiment, the system maintains histograms on transaction processing of various time windows. Various time window histograms can be used to augment predictions on execution and outcome. For example, if a given processor changes operating parameters or declines operations in a different manner than determined by the trained model, the short-term histogram analysis can immediately and dynamically identify the change and override ML optimization based on the prediction, and instead heavily weight the histogram information. In further embodiments, the system can retrain any machine learning model based on historical data to account for the recent change. Until the model(s) are retrained, the system can leverage the more recent analysis by weighting recent performance information.

According to another aspect, optimal routing can include analysis and operations to ensure failed transactions are re-executed successfully. According to one embodiment, the system can implement machine learning models trained on failed transactions that are re-executed successfully. The system can leverage predictions made by the machine learning models to adjust parameters of a given transaction to increase its likelihood of success. For example, the system can identify issues to resolve with the current payment modality, processor, security requirement, etc., to ensure a successful operation. In other examples, the system can predict on the use of the new payment modality, the use of different, and/or security protocols the use of a new processor, among other options. The various machine learning models discussed above can also be trained on re-execution data specifically to predict on an optimal route after a failed transaction. In addition, process and rules derived from re-execution data can also be employed to select an optimal route, in addition to and/or instead of machine learning models, among other options.

Figure 18:
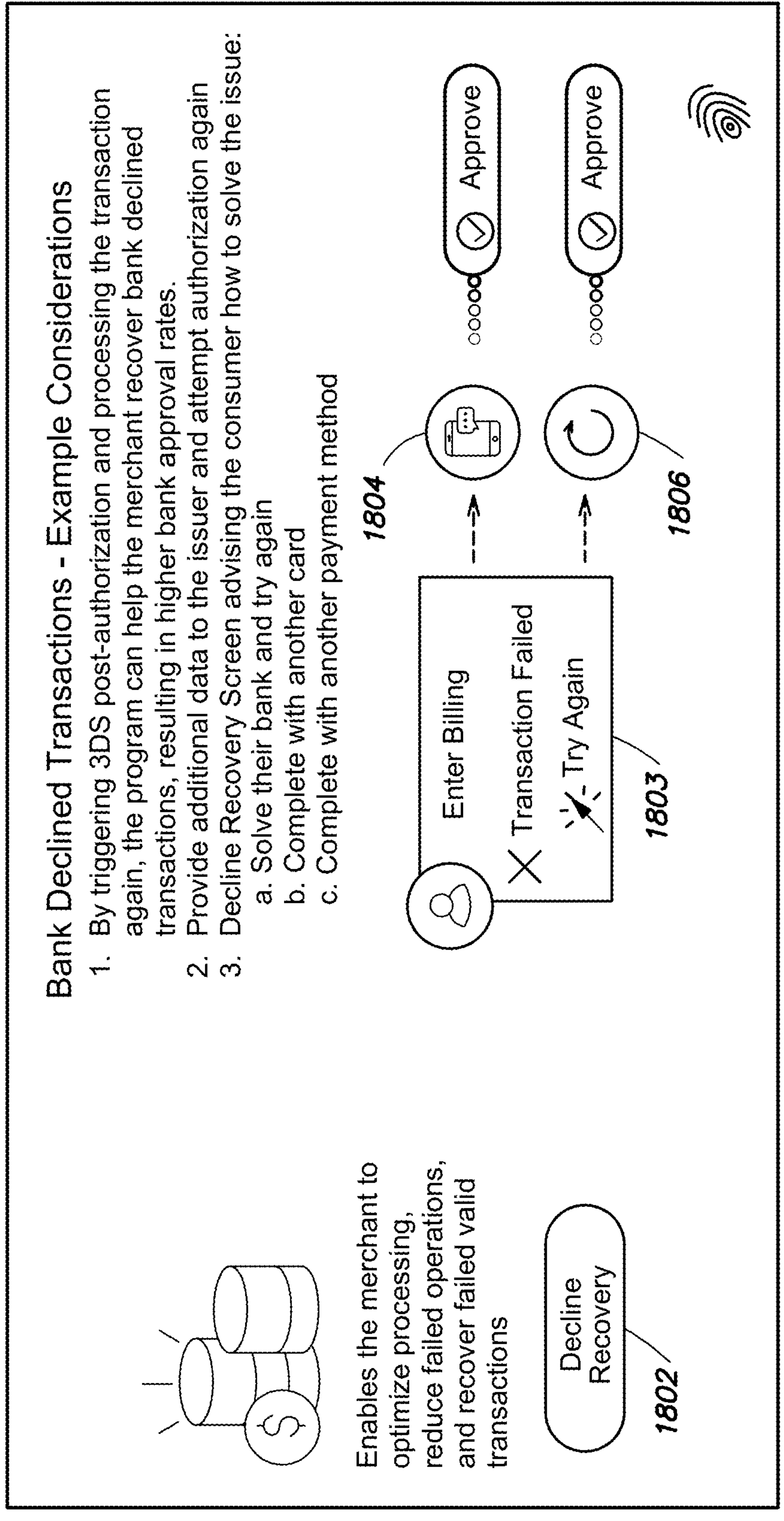
FIG. 18 is a conceptual diagram of re-execution operations, according to one embodiment.

Shown in FIG. 18 are options for processing re-execution. For example, in bank decline transactions the system can analyze a number of options for selecting an optimal routing of a re-execution or resubmission of a transaction. For example, the system can determine that triggering enhanced security post authorization will result in a successful operation. Further, the system can identify when providing additional data (e.g., fraud analysis determination, transaction history, purchaser characteristic analysis, etc.) improves the likelihood success for the operation and act accordingly. In various embodiments, the system leverages the determination of an optimal routing to suggest corrections to purchaser the user interface. For example, in response to a failure the system can initiate decline recovery operations (e.g., 1802). FIG. 18 illustrates a number of example considerations when attempting the execution of a transaction, specifically bank declined transactions. Shown at 1803 is an example interface displayed to a purchaser upon entering transaction information that results in a failure. The system can identify options that are predicted to result in an approved transaction (e.g., 1804 or 1806).

In some embodiments, the system can update a user interface for a purchaser (for example, though notifications to a merchant, APIs, etc.) as they are selecting a payment modality. For example, the system can model the outcome of a selected option and identify for the purchaser whether enhanced security would be required if they select a particular option in the user interface. In further example, the system can order payment modalities based on whether enhanced security requirements will be triggered and display that information in the user interface. In yet other embodiments, the system can advise that a different payment modality is preferable to the one selected and/or would provide the most optimal routing to ensure success.

The terms "program" or "software" or "app" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements.

This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed:

1. An intelligent routing system, comprising:

at least one processor operatively connected to a memory, the at least one processor when executing configured to:

present an interface to a customer comprising one or more fields and receiving information associated with an initiation of a transaction including identification data, payment information, and contact information for the customer;

accept as input to at least one machine learning model the information associated with an initiation of the transaction;

evaluate with the at least one machine learning model a plurality of processing routes for the transaction, the evaluation comprising:

for a first processing route of the plurality of processing routes, determine a first computational burden associated with executing the transaction, the first processing route comprising a first set of system routing options including (1) one or more intermediary systems, (2) requirements associated with the intermediary systems, and (3) any triggers associated with additional computational burdens including analysis of any trigger that increases security information requested, the first computational burden being determined based at least in part on the requirements associated with the intermediary systems and the triggers caused by executing the transaction according to the first processing route, including any trigger that increases security information requested;

for a second processing route of the plurality of processing routes, determine a second computational burden associated with executing the same transaction, the second processing route comprising a second set of system routing options including (1) one or more intermediary systems, (2) requirements associated with the intermediary systems, (3) and any triggers associated with additional computational burdens, the second computational burden being determined based at least in part on the requirements associated with the intermediary systems and the triggers caused by executing the transaction according to the second processing route;

evaluate probabilities of executing the transaction successfully associated with the first processing route and second processing route;

compare the first computational burden with the second computational burden;

based on a first probability of executing the transaction successfully with the first processing route meeting a threshold and the first computational burden associated with the first processing route being less than the second computational burden associated with the second processing route, execute the transaction using the first processing route; and based on a second probability of executing the transaction successfully with the second processing route meeting the threshold and the second computational burden associated with the second processing route being less than the first computational burden associated with the first processing route, execute the transaction using the second processing route.

2. The system of claim 1, wherein the at least one processor is further configured to analyze security options for the plurality of processing routes to determine the at least one route having a highest probability of success.

3. The system of claim 2, wherein the at least one processor is further configured to determine the at least one route having the highest probability of success based on evaluation of enhanced security protocols for each processor, payment method, intermediary, and acquirer system of the plurality of routes.

4. The system of claim 1, wherein the at least one processor is further configured to determine enhanced security protocols negatively impact successful operation.

5. The system of claim 4, wherein the at least one processor is further configured to select an alternative routing to eliminate enhanced security protocols.

6. The system of claim 1, wherein the at least one processor is configured to:

determine short term analysis of the plurality of processing routes disagrees with the at least one machine learning model;

dynamically weight the short term analysis such that selection and execution of the transaction using the at least one processing route is based on the short term analysis.

7. The system of claim 6, wherein the at least one processor is configured to adjust the weighting of the short term analysis based on the observed execution of the at least one processing route.

8. The system of claim 1, wherein the at least one processor is configured to:

based on a plurality of output probabilities meeting the threshold, select and execute the transaction using a respective one of a plurality of processing routes having a greatest probability of returning a successful transaction.

9. The system of claim 1, wherein the at least one machine learning model is trained on historical payment information.

10. The system of claim 9, wherein the historical payment information includes attributes specifying at least one or more of geographic information, payment user's device, connection details, and an aggregated reputation of the transaction.

11. The system of claim 1, wherein the at least one machine learning model is trained to output the probability of executing the transaction successfully based on an evaluation of a plurality of processing systems included in a processing route.

12. The system of claim 1, wherein the at least one machine learning model is trained to output the probability of executing the transaction successfully based on prior knowledge of a payment user's actions.

13. The system of claim 1, wherein the at least one machine learning model is trained to output the probability a payment user will respond positively to an enhanced security challenge.

14. The system of claim 1, wherein the at least one machine learning model is trained to evaluate timing of presentation of the information associated with the transaction to output the probability of executing the transaction in a specific time frame.

15. The system of claim 1, wherein the at least one processor is configured to generate a plurality of candidate routes for executing the transaction.

16. The system of claim 9, wherein the at least one processor is configured to evaluate a respective route based on the probability that a respective merchant processing triggers enhanced security requirements.

17. A computer implemented method for intelligent routing, the method comprising:

presenting an interface to a customer comprising one or more fields and receiving information associated with an initiation of a transaction including identification data, payment information, and contact information for the customer;

accepting, by at least one processor, information associated with the initiation of the transaction as input to at least one machine learning model the information associated with an initiation of the transaction;

evaluating, with the at least one machine learning model executed by the at least one processor, a plurality of processing routes for the transaction, the evaluation comprising:

for a first processing route of the plurality of processing routes, determining a first computational burden associated with executing the transaction, the first processing route comprising a first set of system routing options including (1) one or more intermediary systems, and a first outcome system, (2) requirements associated with first participant systems, and (3) any triggers associated with additional computational burdens including analysis of any trigger that increases if security information requested, the first computational burden being determined based at least in part on the requirements associated with the intermediary systems and the triggers caused by executing the transaction according to the first processing route, including any trigger that increases security information requested;

for a second processing route of the plurality of processing routes, determining a second computational burden associated with executing the same transaction, the second processing route comprising a second set of system routing options including (1) one or more intermediary systems, (2) requirements associated with the intermediary systems, and (3) any triggers associated with additional computational burdens, the second computational burden being determined based at least in part on the requirements associated with the intermediary systems and the triggers caused by executing the transaction according to the second processing route; and evaluating by the at least one machine learning model probabilities of executing the transaction successfully associated with the first processing route and second processing route;

compare the first computational burden and the second computational burden;

executing, by the at least one processing, the transaction using the first processing route based on a first probability of executing the transaction successfully with the first processing route meeting a threshold and the first computational burden associated with the first processing route being less than the second computational burden associated with the second processing route; and executing, by the at least one processor, the transaction using the second processing route based on a second probability of executing the transaction successfully with the second processing route meeting a threshold and the second computational burden associated with the second processing route being less than the first computational burden associated with the first processing route.

18. The method of claim 17, wherein the method further comprises analyzing security options for the plurality of processing routes to determine the at least one route having a highest probability of success.

19. The method of claim 18, wherein the method further comprises determining the at least one route having the highest probability of success based on evaluation of enhanced security protocols for each processor, payment method, intermediary, and acquirer system of the plurality of routes.

20. The method of claim 17, wherein the method further comprises determining enhanced security protocols negatively impact successful operation.

21. The method of claim 20, wherein the method further comprises selecting an alternative routing to eliminate enhanced security protocols.

22. The method of claim 17, wherein the method further comprises:

determining short term analysis of the plurality of processing routes disagrees with the at least one machine learning model; and dynamically weighting the short term analysis such that selecting and triggering of the transaction using the at least one processing route is based on the short term analysis.

23. The method of claim 22, wherein the method further comprises adjusting the weighting of the short term analysis based on the observed execution of the at least one processing route.

* * * * *